(12) United States Patent
Dahlkamp et al.

(10) Patent No.: US 12,131,583 B2
(45) Date of Patent: Oct. 29, 2024

(54) IDENTIFYING OBJECTS WITHIN IMAGES FROM DIFFERENT SOURCES

(71) Applicant: Apple Inc., Cupertino, CA (US)

(72) Inventors: Hendrik Dahlkamp, Redwood City, CA (US); Vinay Sharma, Palo Alto, CA (US); Nitin Gupta, Cupertino, CA (US); Floris Chabert, San Francisco, CA (US); Andrew C. Edwards, Altadena, CA (US); Mitchell Williams, San Diego, CA (US); Jonghoon Jin, Cupertino, CA (US); Nicholas M. Fraioli, Mountain View, CA (US); Aravindhan K. Krishnan, San Jose, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/949,880

(22) Filed: Sep. 21, 2022

(65) Prior Publication Data
US 2023/0014837 A1    Jan. 19, 2023

Related U.S. Application Data

(63) Continuation of application No. 17/033,423, filed on Sep. 25, 2020, now Pat. No. 11,514,717.
(Continued)

(51) Int. Cl.
*G06K 9/36* (2006.01)
*G06F 18/22* (2023.01)
(Continued)

(52) U.S. Cl.
CPC ............ *G06V 40/173* (2022.01); *G06F 18/22* (2023.01); *G06F 21/602* (2013.01); *G06T 7/11* (2017.01);
(Continued)

(58) Field of Classification Search
CPC ...... G06V 40/16–40/179; G06V 10/82; G06V 40/50–40/58; G06N 20/00–20/20; G06N 3/02–3/105; G06T 2207/20081
See application file for complete search history.

(56) References Cited

U.S. PATENT DOCUMENTS 8,189,577 B2   5/2012   Vaswani et al.
8,365,010 B2   1/2013   Olson et al.
(Continued)

FOREIGN PATENT DOCUMENTS

WO   WO-2019222725 A1 * 11/2019 ............. G06N 20/00

OTHER PUBLICATIONS

"Using Your Video Services", Telus, Available Online at: https://www.telus.com/en/bc/support/article/using-your-video-services, Mar. 27, 2020, pp. 1-13.
(Continued)

*Primary Examiner* — Brian Werner
(74) *Attorney, Agent, or Firm* — Kilpatrick Townsend & Stockton LLP

(57) ABSTRACT

Techniques are disclosed for providing a notification that a person is at a particular location. For example, a resident device may receive from a user device an image that shows a face of a first person, the image being captured by a first camera of the user device. The resident device may also receive, from another device having a second camera, a second image showing a portion of a face of a second person, the second camera having a viewable area showing a particular location. The resident device may determine a score indicating a level of similarity between a first set of characteristics associated with the face of the first person and a second set of characteristics associated with the face of a second person. The resident device may then provide to the user device a notification based on determining the score.

22 Claims, 7 Drawing Sheets

Related U.S. Application Data

(60) Provisional application No. 63/034,114, filed on Jun. 3, 2020.

(51) Int. Cl.

| | | |
|---|---|---|
| *G06F 21/60* | (2013.01) | |
| *G06T 7/11* | (2017.01) | |
| *G06V 10/80* | (2022.01) | |
| *G06V 20/52* | (2022.01) | |
| *G06V 40/16* | (2022.01) | |
| *G06V 40/50* | (2022.01) | |
| *H04L 9/08* | (2006.01) | |

(52) U.S. Cl.
CPC ............ *G06V 10/803* (2022.01); *G06V 20/53* (2022.01); *G06V 40/172* (2022.01); *G06V 40/50* (2022.01); *H04L 9/085* (2013.01); *G06T 2207/20132* (2013.01); *G06T 2207/30201* (2013.01)

(56) References Cited

U.S. PATENT DOCUMENTS

| | | |
|---|---|---|
| 8,711,217 B2 | 4/2014 | Venetianer et al. |
| 8,804,997 B2 | 8/2014 | Gagvani et al. |
| 9,197,861 B2 | 11/2015 | Saptharishi et al. |
| 9,779,307 B2 | 10/2017 | Laska et al. |
| 9,830,503 B1 | 11/2017 | Martin et al. |
| 9,883,027 B2 | 1/2018 | Dave et al. |
| 10,013,153 B1 | 7/2018 | Freeman et al. |
| 10,049,281 B2 | 8/2018 | Verano et al. |
| 10,217,068 B1 | 2/2019 | Davis et al. |
| 10,425,475 B2 | 9/2019 | Cahana et al. |
| 10,586,433 B2 | 3/2020 | Stewart et al. |
| 10,929,798 B1 | 2/2021 | Kinney et al. |
| 11,328,153 B1* | 5/2022 | Mumm ................ G06V 40/168 |
| 11,356,352 B2 | 6/2022 | Rauenbuehler et al. |
| 11,514,717 B2 | 11/2022 | Dahlkamp et al. |
| 11,908,143 B2 | 2/2024 | Bolouki et al. |
| 11,921,831 B2 | 3/2024 | Khadloya et al. |
| 2003/0023690 A1 | 1/2003 | Lohtia |
| 2004/0136574 A1* | 7/2004 | Kozakaya ............ G06V 40/161 |
| | | 382/118 |
| 2006/0204058 A1* | 9/2006 | Kim ..................... G06V 40/172 |
| | | 382/118 |
| 2007/0014244 A1 | 1/2007 | Srinivasan et al. |
| 2013/0086607 A1 | 4/2013 | Tom et al. |
| 2015/0074259 A1 | 3/2015 | Cowgill et al. |
| 2015/0131648 A1 | 5/2015 | Shuman et al. |
| 2016/0005280 A1 | 1/2016 | Laska et al. |
| 2016/0043827 A1 | 2/2016 | Filson et al. |
| 2016/0092724 A1 | 3/2016 | Jeong |
| 2017/0257226 A1 | 9/2017 | Bi |
| 2017/0262472 A1* | 9/2017 | Goldenberg .......... H04W 88/02 |
| 2017/0344703 A1 | 11/2017 | Ansari et al. |
| 2018/0268202 A1* | 9/2018 | Yu ........................ G06F 16/743 |
| 2018/0276465 A1 | 9/2018 | Lee et al. |
| 2018/0285628 A1 | 10/2018 | Son et al. |
| 2018/0350213 A1 | 12/2018 | Bart et al. |
| 2018/0373924 A1 | 12/2018 | Yoo et al. |
| 2019/0063140 A1 | 2/2019 | Trundle et al. |
| 2019/0087647 A1 | 3/2019 | Du |
| 2019/0139381 A1 | 5/2019 | Harpole |
| 2019/0155659 A1 | 5/2019 | Rodriguez Bravo et al. |
| 2019/0205620 A1* | 7/2019 | Yi ......................... G06V 40/168 |
| 2019/0236342 A1 | 8/2019 | Madden et al. |
| 2020/0082157 A1 | 3/2020 | Susskind et al. |
| 2020/0388139 A1 | 12/2020 | Saha et al. |
| 2021/0006835 A1 | 1/2021 | Slattery et al. |
| 2021/0134100 A1 | 5/2021 | Larovere et al. |
| 2021/0383100 A1 | 12/2021 | Dahlkamp et al. |
| 2021/0383554 A1 | 12/2021 | Bolouki et al. |

OTHER PUBLICATIONS

U.S. Appl. No. 17/033,423, Non-Final Office Action, Mailed On Mar. 22, 2022, 62 pages.

U.S. Appl. No. 17/033,423, Notice of Allowance, Mailed On Aug. 24, 2022, 7 pages.

Pandit et al., "Intelligent Security Lock", International Conference on Trends in Electronics and Informatics ICEI 2017, IEEE, 2017, pp. 713-716.

Pawar et al., "Smart Home Security using IoT and Face Recognition", 2018 Fourth International Conference on Computing Communication Control and Automation (ICCUBEA), Aug. 16-18, 2018, pp. 1-6.

International Patent Application No. PCT/US2021/035005, International Search Report and Written Opinion, Mailed On Sep. 21, 2021, 11 pages.

U.S. Appl. No. 17/716,332, "Non-Final Office Action", May 10, 2023, 14 pages.

U.S. Appl. No. 17/199,166, "Non-Final Office Action", Jan. 27, 2023, 24 pages.

International Patent Application No. PCT/US2021/034748, "International Preliminary Report on Patentability", Dec. 15, 2022, 7 pages.

International Patent Application No. PCT/US2021/035005, "International Preliminary Report on Patentability", Dec. 15, 2022, 8 pages.

U.S. Appl. No. 17/469,630, "Final Office Action", Apr. 11, 2024, 27 pages.

Ejaz et al., "Masked Face Recognition Using Convolutional Neural Network", 2019 International Conference on Sustainable Technologies for Industry 4.0 (STI), Dec. 25, 2019, 6 pages.

Wang et al., "Masked Face Recognition Dataset and Application", Available online At: https://arxiv.org/pdf/2003.09093.pdf, Cornell University Library, Mar. 23, 2020, pp. 1-3.

U.S. Appl. No. 17/469,630, "Non-Final Office Action", Jul. 30, 2024, 26 pages.

* cited by examiner

IDENTIFYING OBJECTS WITHIN IMAGES FROM DIFFERENT SOURCES

CROSS-REFERENCES TO RELATED APPLICATIONS

This application is a continuation of U.S. patent application Ser. No. 17/033,423 filed Sep. 25, 2020, which claims the benefit of and priority to U.S. Provisional Application No. 63/034,114, filed Jun. 3, 2020, entitled "IDENTIFYING OBJECTS WITHIN IMAGES FROM DIFFERENT SOURCES," the entire contents of which are incorporated by reference herein in their entirety for all purposes. This application is related to U.S. Provisional Application No. 63/034,262, filed Jun. 3, 2020, entitled "ACTIVITY ZONE FOR CAMERA VIDEO," U.S. Non-Provisional application Ser. No. 17/199,166, filed Mar. 11, 2021, entitled "ACTIVITY ZONE FOR CAMERA VIDEO," U.S. Provisional Application No. 63/034,110, filed Jun. 3, 2020, entitled "IDENTIFYING REACHABILITY OF NETWORK-CONNECTED DEVICES," and U.S. Non-Provisional application Ser. No. 17/032,619, filed Sep. 25, 2020, entitled "IDENTIFYING REACHABILITY OF NETWORK-CONNECTED DEVICES," the entire contents of which are incorporated by reference herein in their entirety for all purposes.

BACKGROUND

Techniques exist for performing facial recognition using an image of a person's face. For example, a mobile phone camera may capture an image showing a portion of a person's face. An application may analyze the image to determine characteristics of the person's face and then attempt to match the person's face with other known faces. However, facial recognition is a growing field and various challenges exist related to performing recognition. For example, there are many types of cameras which may capture a variety of images. Sometimes it can be difficult to accurately recognize faces when provided images from different cameras as input.

DETAILED DESCRIPTION OF THE INVENTION

Figure 1:
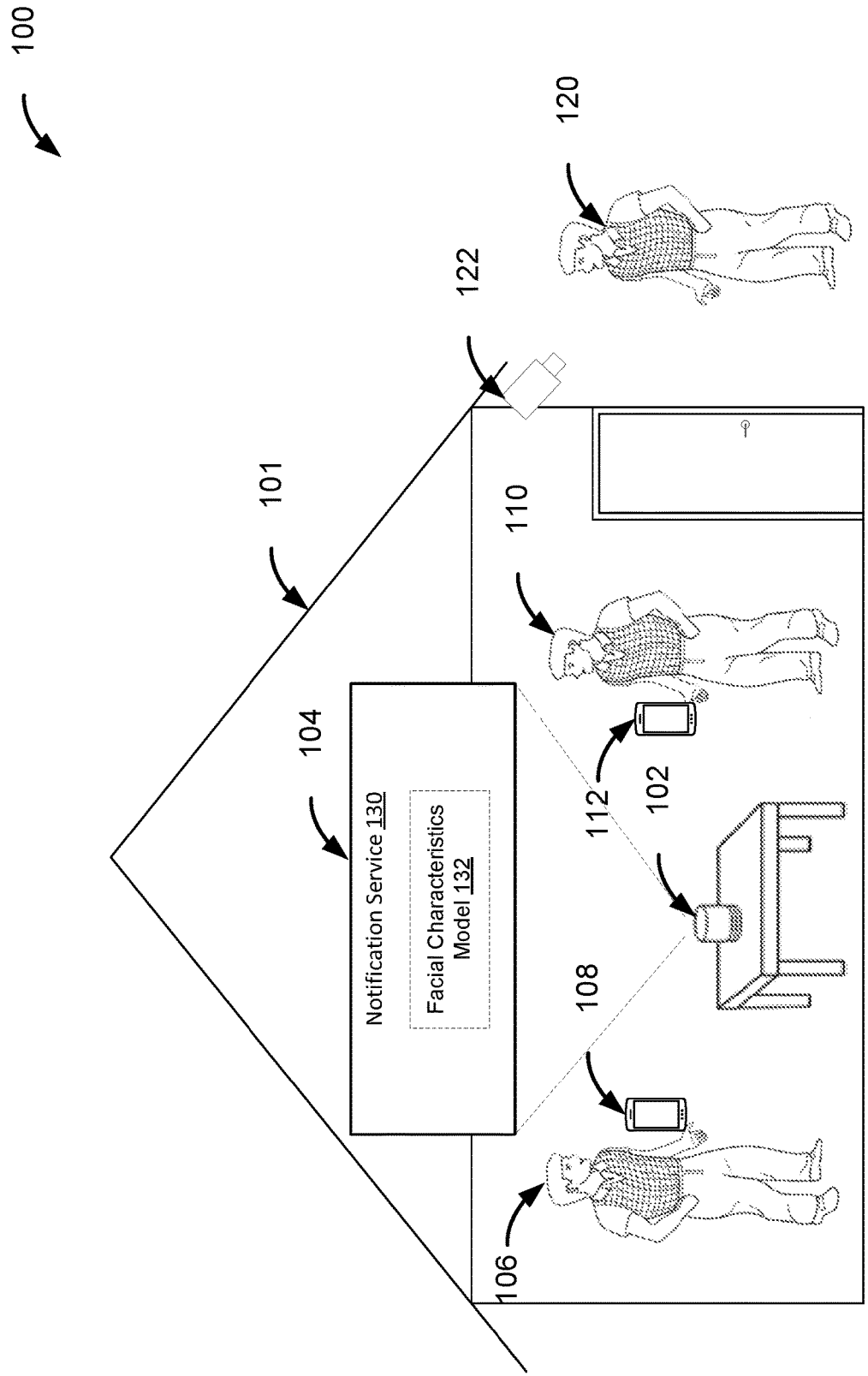
FIG. 1 is a simplified block diagram of an example system, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments, of the present disclosure can provide techniques for providing or suppressing a notification when a particular person is detected at a particular location. For example, a user may want to be notified if someone they recognize is at the front door. However, in other instances, they may not want to bothered if the person at the door is someone they recognize. In one example, video or still images of a person may be captured by a computing device (e.g., at least including a camera). In some examples, if that person is detected as a particular person (e.g., someone known or recognized by a user device (or a user of the user device)), the computing device may determine to notify the user about the particular person being at the particular location. That way, the user will know that someone they know/recognize is at the particular location (e.g., the front door). However, in other examples, the computing device may determine to suppress the notification if the detected person is recognized, thus avoiding unnecessary notifications (e.g., the user may not care to be notified if their spouse or roommate is detected at the front door).

In some examples, a resident device (e.g., a home automation device such as a smart speaker, a digital media player, or other appliance) may receive one or more image croppings from a user device (e.g., a mobile phone). The image croppings may be generated from a plurality of images that are managed as part of a library of images (e.g., a photo library) stored on the user device, and including contacts associated with the user device. Each of the image croppings may comprise a portion of a face of a first person, whereby the first person may be one of the contacts associated with the user device. Also, each image cropping may have been selected for reception by the resident device based at least in part on a determined level of information gain associated with the particular image cropping, which may enable the resident device to perform facial recognition of the face of the first person. As discussed further herein, the information gain provided by a particular image (or image cropping) may correspond to the amount of information that one or more features of a particular image provide, relative to other images. In some embodiments, the information gain may be based on a uniqueness and/or a higher level of quality of the particular image when compared to other images. The resident device may also receive one or more images from another device that includes a second camera (e.g., a home observation camera), whereby the second camera has a viewing area including a particular location (e.g., a home's front door porch). The one or more images may, respectively, include a portion of a face of a person at the front door, whose identity is not yet determined. The resident device may then determine a score that corresponds to a level of similarity between a first set of characteristics associated with the face of the first person and a second set of characteristics associated with the face of the person at the front door whose identity is not yet determined. Based at least in part on the score, the resident device may then determine whether they are in fact the same person (e.g., whether the person at the front door is the same as the personal contact in the photo library). The resident device may then provide a notification based at least in part on the determination. For example, the resident device may transmit the notification to the user device that the person at the particular location is (or is not) the same as the first person, who was identified as a contact associated with the user device.

In an illustrative example, consider a scenario in which a resident device within a home environment provides notifications about the presence of a person nearby (or inside) the home. In this example, the resident device may be a home automation device (e.g., a smart speaker, a smart digital media player) that is communicatively connected to a camera. In one example, the camera may be set-up to observe the area around the front door of the home (e.g., to capture images of people who may knock on the door and/or ring the doorbell). Accordingly, the resident device may be configured to receive and process one or more images from the observation camera. The resident device may further be configured to receive and store images (e.g., image croppings) from one or more user devices (e.g., mobile phones). For example, a user device may include a camera component, which may be used for capturing images (e.g., of contacts (e.g., people) associated with a user of the user device). The images may be stored in a local repository (e.g., a local memory repository such as a photo library) of the user device. In some examples, the images captured by the user device camera may have a different level (e.g., a higher level) of quality than images captured by the observation camera (e.g., due to different image resolutions, lighting differences, etc.). Additionally, the images captured by the user device camera may have been taken for the sake of entertainment and/or enjoyment, and are not stored for security purposes or with any intent for being used to recognize people filmed by the observation camera. Thus, these photo library images may be candid scenes, stylized scenes, or the like, and may not always include direct images of people's faces.

Continuing with the above illustration, the resident device may receive one or more image croppings that were selected and generated from the photo library of the user device. The one or more image croppings may, respectively, comprise a portion of a face of a first person who is a contact of the user of the user device. For example, one image cropping may show a side-view of the contact's face, taken in one setting (e.g., a baseball game), while another image cropping may show a front view of the contact's face (e.g., taken as an indoor portrait shot). In this example, it should be understood that there may be many different portions (e.g., views) of the face of the first person that are shown in the images from the photo library, within different contexts. Accordingly, the one or more image croppings may be selected from a larger set of image croppings of the face of the contact based at least in part on determining that the particular set of one or more image croppings results in a greater level of information gain that may be used for subsequent facial recognition of the contact's face. Also, it should be understood that each image (e.g., non-cropped image) that includes a portion of the face of the first person may also include other objects (e.g., other people's faces, physical objects, environments, etc.). Accordingly, the set of one or more image croppings received from the user device may have been respectively cropped to exclude other objects beyond the portion of the face of the first person.

Upon receiving the one or more image croppings from the user device, the resident device may determine a first set of characteristics of the face of the contact associated with the user device. In one example, the resident device may utilize a trained facial characteristics model to determine the first set of characteristics based at least in part on the one or more image croppings. For example, the trained facial characteristics model may generate a first faceprint for the contact. For example, the first faceprint may correspond to a multi-dimensional vector, whereby each dimension is associated with at least one characteristic of the first set of characteristics of the face of the contact. In some examples, as described further herein, the facial characteristics model may be trained to generate a faceprint based at least in part on images (e.g., and/or image croppings) received from different cameras. For example, the facial characteristics model may receive a first set of training images captured by a camera of the user device (e.g., the mobile phone), and a second set of training images captured by the observation camera. Each training image of each set may include a portion of the face of a person (e.g., the same person). In some examples, the first set of training images may have a different (e.g., higher) level of quality than the second set of training images. As described further herein, the facial characteristics model may be trained to generate a faceprint of the person based at least in part on a difference in quality (and/or a difference in camera source) between the two sets of images.

Continuing with the above illustration, the resident device may further receive one or more images (e.g., a sequence of video frames) from the observation camera, as described above. For example, a person may approach the front door of the home, whereby the person's face is shown within a viewable area of the observation camera. In this example, the residence device may determine a second set of characteristics associated with the face of the person at the front door based at least in part on the sequence of video frames capturing the person at the front door. For example, the trained facial characteristics model of the resident device may determine a second faceprint of the face of the person at the front door.

The resident device may then determine a score that corresponds to a level of similarity between the first set of characteristics of the face of the first person (e.g., corresponding to the first faceprint) and the second set of characteristics of the face of the person at the front door (e.g., corresponding to the second faceprint). For example, the resident device may determine the score based on a determined similarity (e.g., a cosine similarity) between the first faceprint and the second faceprint. Then, based on the score, the resident device may determine whether the person at the front door is the same as first person (contact). In some embodiments, as described further herein, the resident device may utilize a face quality metric to determine if the face of the person at the front door is recognizable or not. For example, in a case where the person's face is turned away from the observation camera, the resident device may be able to identify that a person is in front of the doorway, but may not be able to recognize the face of the person. In a case where the face is determined to be recognizable (e.g., the person's face is facing the camera), then the resident device may then further determine whether the face of the person at the front door matches one of the contacts (e.g., the first person) of the user device.

In some embodiments, the resident device may provide a notification based at least in part on the determination of whether the person at the front door is recognizable/unrecognizable and/or whether the person at the front door matches one of the contacts of the user device (e.g., the first person). For example, continuing with the illustration above, in the event that the resident device determines that the person at the front door is recognizable and is the first person, the resident device (e.g., a smart speaker) may provide the notification via an audio signal, announcing that the contact has arrived at the home. In another example, the resident device may provide the notification to a user device (e.g., a mobile phone) via a message that includes text, audio, images, video, or any suitable combination thereof. In another example, the resident device may be configured to announce only when non-contacts have arrived (and otherwise remain silent). In this example, upon determining that the person at the front door is not a known contact (e.g., not the first person), the resident device may announce that a person who is not a contact has arrived. As described further herein, other channels and/or conditions for providing notifications may be utilized.

In some embodiments, the resident device may provide within (and/or alongside) the notification an image that corresponds to the highest quality image determined among the sequence of frames (e.g., images) received from the observation camera. For example, as described above, the resident device may receive the sequence of frames (e.g., from a video camera) that respectively capture the same person approaching the front door. Each frame may have different levels of quality compared to other frames. For example, one frame might show a person's face from a side angle instead of a straight on view. Another frame might also show the same person's face, but has an image artifact, poor lighting quality, or other characteristic that degrades image quality. The resident device may determine, for each frame showing the person's face, a face quality score based in part on the face quality metric, as described herein. The resident device may then sort the scores and select the image that has the highest face quality score. The resident device may then provide to a user device (e.g., as part of the notification) the highest quality image showing the face of the person at the front door. The user device may then present the image on a display (e.g., a mobile phone display, a TV display, etc.) for visual identification. In this way, the user may be presented with the highest quality image of the person's face, which may provide a better user experience.

In some embodiments, an image provided as part of a notification to a user device may also be tagged by the user device upon receiving input by a user. For example, suppose that the resident device detects a person at the front door, and determines that the person is not one of the known contacts of the user (e.g., there are no images of the person in the user's photo library). In this case, upon receiving the notification, the user device may present the user with an opportunity to tag the photo, for example, in case the user recognizes the person at the door as a contact of the user. Upon receiving input to tag (e.g., label the photo), the user device may add the photo to a reference set of images that may be used for future detection of the person, as described further herein.

In some embodiments, newly tagged photos may be used to further train the facial characteristics model. For example, the newly tagged photos may be included in a reference set of images showing the particular person's face. A faceprint may be generated for a newly tagged photo within the reference set, and the facial characteristics model may be trained to associate the faceprint with faceprints of other (e.g., later received) photos of the same person's face.

In some embodiments, the facial characteristics model may be trained to detect and recognize a face in a situation in which a person is wearing a face mask. For example, consider a scenario in which a person approaches the front door of a home wearing a face mask. In this scenario, the facial characteristics model may recognize that the person is wearing a facemask, and generate a first faceprint of the face of the person wearing the face mask. The facial characteristics model may be trained to account for the presence of a face mask, and may compare the first faceprint with faceprints generated from images of faces in a reference set of images drawn from the photo gallery of a user device. In some embodiments, although a face may be recognized even with the presence of a face mask, the image of the face with the face mask may not be included within a notification sent to the user device. In some embodiments, the image of the face with the face mask may be included within the notification, but the user may not be given the opportunity to subsequently tag the image. In some embodiments, this may ensure that images within facemasks are not included in a corpus of images used to generate a reference set of images (e.g., which may otherwise degrade the quality of facial recognition performed by the facial characteristics model).

The embodiments of the present disclosure provide several technical advantages over existing systems. In one example, embodiments of the present disclosure enable a system to perform facial recognition of future images based on images that are already existing and tagged (e.g., assigned to a contact) within in a user's personal photo library on their user device (e.g., mobile phone). This may reduce resource consumption by obviating a need for users to take one or more photos (e.g., images) for the purpose of performing future facial recognition. In another example, embodiments of the present disclosure may reduce the amount of network bandwidth, storage, and processing resources required. For example, instead of a resident device receiving and processing a large amount of photos from a user's photo library on their mobile device (e.g., for later use in facial recognition), the resident device may instead only receive a subset of photos of the photo library, whereby the subset has been selected according to which photos provide a higher level of information gain. In another example, embodiments of the present disclosure enable systems to perform facial recognition, whereby a set of images used as reference images for facial recognition may be different than a set of images that is used to perform the actual facial recognition. For example, a set of reference images may be captured by a user's mobile device (e.g., and/or shared by another mobile device with the user's mobile device) and then shared with the resident device. Later, the resident device may perform the actual facial recognition using images received from a separate observation camera, which may generate images having a different level of quality (e.g., lower resolution, more noise, more image artifacts, etc.) than the set of reference images. In this way, embodiments of the present disclosure enable a method whereby existing photos generated from one camera (e.g., an existing photo library of a mobile phone) may be used to perform, with high accuracy, facial recognition using photos generated from another camera (e.g., an observation camera) as input.

For clarity of illustration, it should be understood that, although embodiments of the present disclosure are primarily directed to performing facial recognition of a person's face, embodiments should not be construed to be so limited. For example, a system of the present disclosure may be trained to recognize any suitable type of object, and then take suitable action accordingly (e.g., providing notifications, granting access, etc.). In one example, a person's hand may contain unique characteristics that may be associated with a person's contact. The system may be trained to recognize hands from images captured by one camera, while using images captured by another camera as reference images.

FIG. 1 is a simplified block diagram 100 that illustrates a system notification service operating in an example environment, according to some embodiments. In FIG. 1, the example environment depicted is a home environment 101. The home environment 101 may include one or more people who have some affiliation (e.g., family members, roommates, etc.). In this example, user 106 and user 110 may represent affiliated users, and, may respectively be associated with user devices 108 and 112. Also, within the home environment 101 there may be a resident device 102 (e.g., a tablet, a smart home controller, a smart digital media player, a home automation device (e.g., that is part of a home automation system), or the like). The resident device 102 may be communicatively connected to an observation camera 122 (e.g., a mounted observation camera), whereby the resident device 102 may receive images (e.g., video frames) from the observation camera 122. As described further herein, the resident device 102 may include a notification service 130 that includes a facial characteristics model 132. The facial characteristics model 132 may be trained to receive one or more images from the observation camera 122, for example, capturing a portion of the face of a person 120 that is approaching the home environment 101 (e.g., the front door). Upon receiving the one or more images from the observation camera 122, the facial characteristics model 132 may determine a set of characteristics of the face of the person 120 (e.g., generating a faceprint of the person). Then, based in part on this determined set of characteristics, the notification service 130 may determine if the face of the person 120 is recognizable and/or if the person 120 is one of the contacts associated with user device 108 and/or user device 112 (e.g., respectively associated with user 106 and/or user 110). The resident device 102 may then determine whether and how to provide a notification (e.g., to one of the user devices) based at least in part on the determination.

Turning to the elements of FIG. 1 in further detail, in some embodiments, a user device (e.g., user device 108 or 112) may be any suitable computing device. In a non-limiting example, the user device may be a mobile phone, a tablet, a PC, a laptop, etc. In some embodiments, the user device may include a camera component, which may be built into the user device or otherwise connected (e.g., via a cable or wireless connection). The user device may have a local repository that is suitable for storing a library of images (e.g., in a photo library) that are captured by the camera component. As discussed further herein (e.g., in reference to FIG. 2), in some embodiments, the photo library of each user device may be shared with the resident device 102 to be used for facial recognition by the notification service 130. For example, both user 106 and user 110 may have a common acquaintance (e.g., a contact person), and both users may use their user devices to capture photos of the common acquaintance. In this example, one or more of the photos of the common acquaintance may be received by the resident device 102, being selected from the photo library of each user device (e.g., 108 and 112) to be used as a part of a reference set of images (e.g., or image croppings) for performing facial recognition. In another example, the photo library of user device 108 may contain images of a friend of user 106 (e.g., person 120), which are shared with the resident device 102. However, the photo library of user device 112 does not contain any images of the friend. In this case, user 110 may have enabled a setting in an application on their user device 112 to be notified (or not notified) if a contact of any affiliated users (e.g., user 106) is detected by the observation camera 122. Accordingly, when person 120 appears at the door of the home, the resident device 102 may send an notification (or refrain from sending a notification) to user device 112 that person 120 has arrived. As discussed further herein, it should be understood that any suitable settings may be determined in regards to sharing photos of contacts across different photo libraries, and/or providing notifications based on the type of person recognized.

In some embodiments, the resident device 102 may be any suitable computing device that resides in a particular environment and is configured to control (e.g., provide control instructions) one or more operations and/or accessories in the environment. In some non-limiting examples, a resident device may be a smart speaker, a smart TV device, a tablet device, a smart digital media player (e.g., configured to provide streaming media to a TV), etc. In the example of FIG. 1, resident device 102 may correspond to a smart speaker device. Upon the resident device 102 determining a recognition of the face of the person 120, the resident device 102 may provide a notification by announcing, for example, that a particular contact (e.g., a contact of one of the users 106, 110) has arrived. In another example, the resident device 102 may transmit a message to one or more of the user devices (e.g., 108 or 112) that the particular contact has arrived. For example, an alert message may pop up on a display of a user device. It should be understood that notifications may be provided by a resident device using any suitable channel and/or method, depending, for example, on the type of resident device, a type of user device, the surrounding environment, etc. For example, consider another embodiment, where the resident device may correspond to a smart TV device (e.g., a digital media player that is connected to a TV). The smart TV device may be equipped to present a graphical user interface (GUI) on the TV, which may include a Picture-in-Picture (PIP) presentation. In this example, the resident device may provide a notification in the form of an audiovisual (AV) feed. For example, the resident device may display a video feed (e.g., received from observation camera 122) in the inset window of the TV. Also, in the case where the observation camera 122 and/or smart TV device may be equipped with a two-way audio (e.g., having a speaker and microphone), the resident device may enable bi-directional communication between a user in the home environment and the person 120 outside. In some embodiments, a resident device may contain a local memory repository that is suitable for storing and processing images (e.g., image croppings) that are received from one or more user devices (e.g. user device 108 and 112). In some embodiments, as described further herein (e.g., in reference to FIG. 5), a residence device may receive image croppings from a user device through an intermediary source (e.g., a remote cloud server). For example, user device 108 may first transmit an image cropping to a cloud server for storage (e.g., temporary storage) and/or analysis. Then, the residence device 102 may subsequently receive the image cropping from the cloud server.

In some embodiments, the resident device 102 may be communicatively connected to any suitable camera. For example, as depicted in FIG. 1, observation camera 122 may be an observation camera that is positioned at a location immediately nearby the home environment 101 (e.g., near the front door). In some non-limiting examples, the observation camera 122 may be a webcam, a pan-tilt-zoom (PTZ) camera, etc. In some examples, the observation camera 122 may be a component of another device (e.g., a tablet), which in turn is connected to the resident device 102. In some examples, the observation camera 122 may transmit a video feed of any suitable image (e.g., frame) quality to the resident device 102. It should be understood that the level of quality of input images received from an observation camera (e.g., observation camera 122) by the resident device 102 may be different than the level of quality of reference images received from one or more of the user devices (e.g., 108, 112) by the resident device 102. As discussed further herein, the facial characteristics model 132 of notification service 130 may be trained to generate a faceprint of the person 120 for performing facial recognition based at least in part on accounting for differences in the level of quality between the reference images and the input images.

Although FIG. 1 depicts a home environment context in which the system detects a person approaching the front door of the home, it should be understood that embodiments of the present disclosure may be perform in any suitable context. For example, instead of being mounted near the front door outside the home, the observation camera 122 may be positioned to have a viewable area of a particular location inside the home. In this example, the system may alert a user within another part of the home that another person (e.g., a child) has entered a particular location within the home. Also, embodiments may also be performed in a non-home environment context. For example, a business office may detect when certain visitors have arrived, or a government office may detect when there may be unauthorized access to a particular location.

As discussed above, the resident device 102 and/or user devices (e.g., 108, 112) may be configured according to one or more control settings. For example, in some embodiments, a user device may receive input from a user for determining whether the photo library of the user device should be shared with other users (e.g., in the home). In one case, user device 108 may share the photo library with user device 112. In this case, any contacts that are determined from images from the photo library of user device 108 may also be considered as contacts associated with user device 112. Accordingly, although in some embodiments, a "photo library" (e.g., also known as a "library of images") may correspond to only images that are stored on a local device, in other embodiments, a "photo library" may correspond to a collection of photos that are shared across multiple user devices. In some embodiments, the user device may also be configured to determine whether to receive (or incorporate) images that are shared from one or more other user devices (e.g., of family members that have shared their respective photo libraries). In some embodiments, the user device may be configured to automatically tag (e.g., label) images that are determined to contain a face of an existing contact associated with the user device (and/or the user). For example, user device 108 may receive an input that tags a person's face in an image of the photo library (e.g., captured by a camera component of user device 108) as being person 120. Thereafter, the user device 108 may automatically tag users captured by the camera of the user device 108 as being person 120. In another example, the user device 108 may present an image captured by observation camera 122 showing person 120. The user device 108 may receive input from user 106 to label the image as showing person 120, which may be later used for facial recognition, as described herein.

In yet another example, the user device 108 may not receive an input from a user to tag someone in an image as being a particular known contact. However, the user device 108 may nevertheless group images together that contain the same face. In some cases, the user device 108 may associate any faces detected in photos in the photo library as being a known contact (e.g., even if an explicit contact name is not assigned).

In some embodiments, a resident device may be configured to provide notifications based at least in part on the type of person recognized. For example, in one embodiment, resident device 102 may receive a request from a user device 108 to only receive notifications when a person is detected who is not a contact associated with user device 108 (e.g., the person is not found in any of the images of the photo library of user device 108). This setting may be used for example, when user 106 only wants to be notified when non-contacts approach the home, but not when relatives are coming home. In another embodiment, resident device 102 may receive a request from a user device 108 to only receive notifications when a person is detected who is a contact associated with user device 108. In another embodiment, the resident device 102 may be configured to provide a notification when any person is detected, whether or not the person is recognizable or unrecognizable. It should be understood that the above described settings are only representative, and any suitable types of settings may be used to configure a resident device and/or user device. In some cases, a particular setting may result in an increase in the number of notifications provided by a resident device (e.g., configuring the resident device to notify a user whenever any person is detected). In some cases, a particular setting may result in a decrease in the number of notifications provided by a resident device (e.g., configuring the resident device 102 to only provide notifications if a person is detected that matches the photo library on the particular user device). In some embodiments, a notification may contain any suitable information beyond the identity of a person that is detected. For example, the resident device 102 may be configured to provide a notification to user device 108 that indicates that person 120 (e.g., a child of user 106) arrived home at a particular time.

Figure 2:
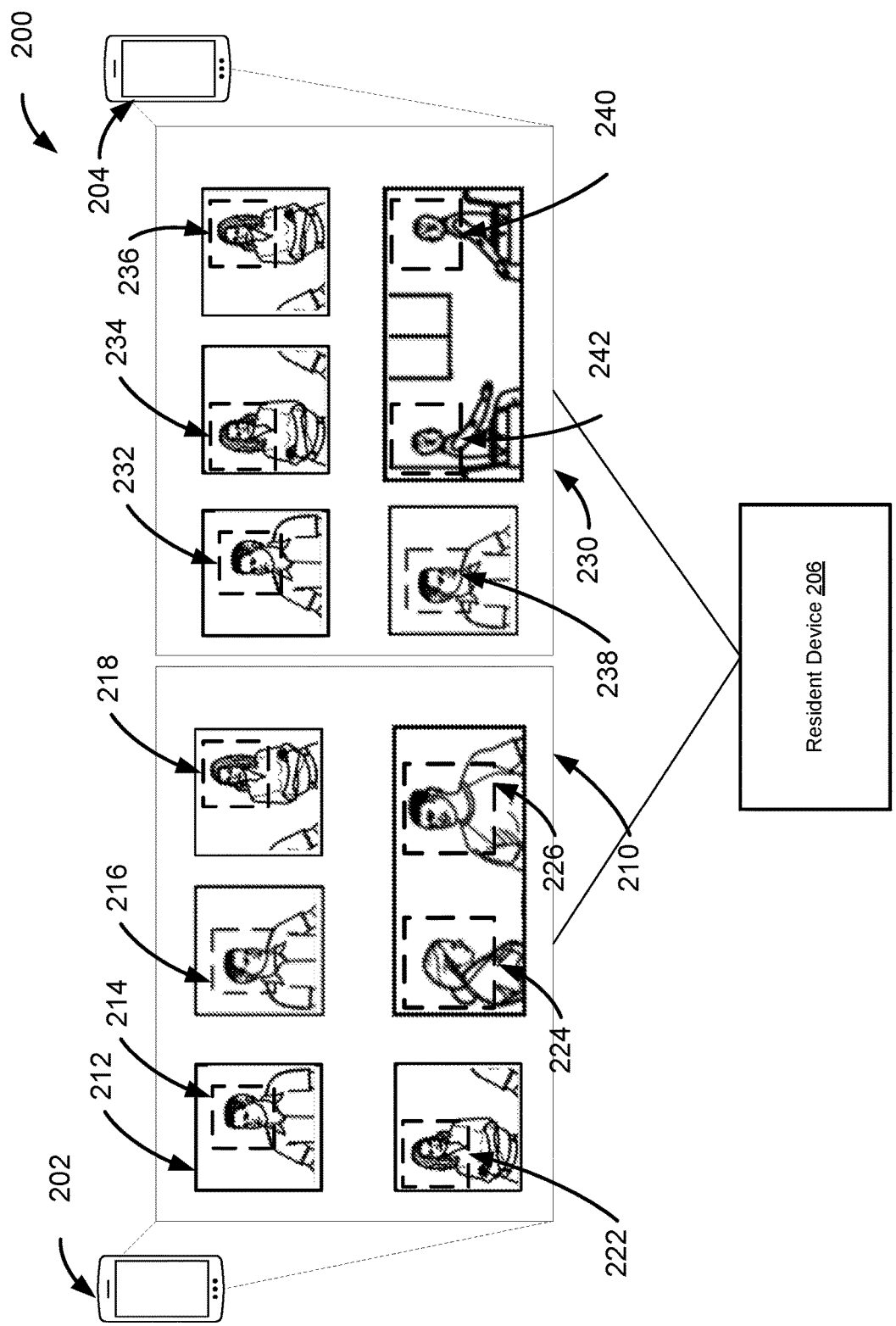
FIG. 2 is another simplified block diagram illustrating at least some example techniques for providing a notification based on image croppings selected from a library of images, according to some embodiments.

FIG. 2 is another simplified block diagram 200 illustrating at least some example techniques for providing a notification based on image croppings selected from a library of images, according to some embodiments. In FIG. 2, a user device 202, a user device 204, and a resident device 206 are depicted. In some examples, user devices 202 and 204, respectively, may be similar to any one of user devices 108 or 112 of FIG. 1. Also, resident device 206 may be similar to resident device 102 of FIG. 1. In some embodiments, each of the user devices may be communicatively connected to the resident device 206. As depicted, user devices 202 and 204 may contain photo libraries 210 and 230 stored in a local memory repository of the respective user device. In some embodiments, an application (and/or service) executing on a particular user device may be responsible for managing the photo library on that device and communicating with the resident device 206 (e.g., configuring settings). In some embodiments, the application may present the photo library (e.g., photo library 210) within a GUI of the user device (e.g., user device 202). Although the respective user devices 202 and 204 of FIG. 2 only depict 5 photos in each photo library (e.g., 210 and 230), this is only for illustration purposes. It should be understood that, in general, a photo library on a given user device may contain any suitable number of images.

In some embodiments, as described above, the images in a photo library of a user device may be received by the user device from any suitable source. Using user device 202 as an example, in one embodiment, the user device 202 may capture an image using a camera component of the user device 202 (e.g., a mobile phone). Upon capturing the image, the user device 202 may store the image in the photo library 210. In another embodiment, the user device 202 may receive one or more images from another device. For example, the user device 202 may directly receive and store images shared from other device (e.g., user device 204, or another device). Note that in some cases, both user devices 202 and 204 may share each other's libraries with one another, even though they don't respectively directly transfer images to the other device. For example, as described above, the photo libraries on each device may be made available (e.g., shared) so that the resident device 206 has access to both libraries. In this case, the resident device may be responsible for managing (e.g., and/or synchronizing) a shared photo library for at least the purposes of providing notifications. As described further herein, this shared photo library that is managed by the resident device 206 may be a subset of photos (e.g., selected image croppings) of respective photo libraries stored in local memory repositories on the user devices 202, 204.

In some embodiments, each image in a photo library (e.g., photo library 210 or 230) may have a particular level of quality. A level of quality of an image may be associated with one or more factors. In some non-limiting examples, the level of quality may be associated with a level of distortion (e.g., radial distortion) in the image, an image resolution (e.g., represented by a number of pixels (or pixels per inch (ppi)), a level of image contrast (e.g., a contrast ratio), an image sharpness, and/or other variables. For example, one variable might correspond to whether there are any occlusions in the picture that block (or obstruct) a face of a person being recognized. Another variable might correspond to whether there are any image artifacts, for example due to image compression or other noise that may be included in an image. It should be understood that, in some examples, different cameras may be associated with different levels of image quality. For example, the camera components of user devices 202 and 204 may be associated with higher levels of image quality than an observation camera (e.g., observation camera 122 of FIG. 1) that is communicatively connected to resident device 206. For example, a user device (e.g., a mobile phone) may be used to capture images of people who may be posing for a photo, and/or in an environment where there may be better lighting, less occlusions, etc. Meanwhile, the observation camera may capture images of people who may not be posing for a photo (e.g., continually moving around), and/or in which the lighting may not be good (e.g., at night without a background light), etc.

Turning to the contents of each of the photo libraries in further detail, as depicted in FIG. 2, each photo library may contain one or more images. In regards to photo library 210 of user device 202, as described above, 5 representative images are depicted. Each image may contain at least a portion of a face of at least one person. It should be understood that other images in the photo library may not contain faces of any people, and may correspondingly provide less (e.g. no) information gain for performing facial recognition, as described further herein. An application executing on the user device may generate image croppings of faces of each person portrayed in an image. For example, image 212 may display a face of a person, from which the application generates image cropping 214. Similar representative image croppings may be generated for other images (e.g., image croppings 216, 218, 222, 224, 226). Note that the image croppings 224 and 226 may be generated from the same non-cropped (e.g., original) image. Similarly, in regards to photo library 230 of user device 204, an application executing on the user device 204 may generate representative image croppings 232, 234, 236, 238, 240, and 242.

In some embodiments, a trained facial characteristics model may be executed on each user device for use in determining which images (e.g., image croppings) should be transmitted to the resident device 206. These image croppings may later be used by the resident device 206 as reference images for performing facial recognition. In some embodiments, the trained facial characteristics model that is executed on a user device (e.g., 202, 204) may be similar to (e.g., the same) the facial characteristics model 132 of the notification service 130 that executes on the resident device 102, although the model may be used for different purpose. For example, as described further herein, the facial characteristics model executing on a user device may be used to generated faceprints from image croppings. Then, based on comparing the generated faceprints to determine a level of information gain from each faceprint, the user device may determine to transmit a subset of the image croppings as reference images for a particular face to the resident device 206. Meanwhile, a similar (e.g., same) facial characteristics model executing on the resident device 206 may be used to generate faceprints for later comparison when determining a score for performing facial recognition. In some embodiments, the trained facial characteristics model may be trained as described herein, for example, in reference to FIG. 4.

In the simplified diagram depicted in FIG. 2, the image croppings generated for each of the user devices respectively portray particular portions (e.g., different views) of faces of two people (e.g., contacts). For example, image croppings 214, 216 and 226 may correspond, respectively, to a particular portion of a face of a first contact person of user device 202. Image croppings 218, 222, and 224 may correspond, respectively, to a particular portion of a face of a second contact person of user device 202. It should be understood that these image croppings are representative. In some embodiments, photo library 210 may contain several more photos of each of the two people, and/or other contact persons. An application (or service) executing on user device 202 may execute the facial characteristics model to determine a set of characteristics of the face for each image cropping. In some embodiments, the facial characteristics model may generate a faceprint that corresponds to the set of characteristics. For example, as described above, a faceprint for image cropping 214 may correspond to a multidimensional vector, whereby each dimension is associated with at least one characteristic of the set of characteristics of the face shown in image cropping 214. Accordingly, the user device 202 may execute the facial characteristics model to generate respective faceprints for image croppings 214, 216, and 226, corresponding to the first contact person. As described above, it should be understood that these image croppings (and faceprints) may already be tagged (e.g., automatically or manually) as corresponding to the first contact person. The user device 202 may then compare the different faceprints for the first contact person to determine a subset of image croppings that provide a level of information gain that enables more accurate facial recognition. For example, the user device 202 may determine that the faceprint for image cropping 214 provides a significantly different view (e.g., portion) of the face of the first contact person from image cropping 216, and thus, provides significant information gain (e.g., newly discovered facial features/characteristics). Accordingly, both image croppings may be included in a subset of image croppings for the first contact person. It should be understood that, in some embodiments, the level of information gain (e.g., uniqueness) provided by an image cropping (e.g., image cropping 214) may be determined based at least in part on determining a distance between the image and one or more other images (e.g., image cropping 216). In some embodiments, a distance between images may be determined based on computing distances between features (e.g., eyes, nose, mouth, chin, etc.) of a face for each image, and then comparing those one or more of those computed distances between images. In some embodiments, the one or more computed distances between facial features may be weighted and/or combined, as suitable for comparison between images. Continuing with the illustration of FIG. 2, the user device 202 may further determine that image cropping 214 shows a similar facial view as image cropping 226, and thus, image cropping 226 may not provide much information gain over image cropping 214. Accordingly, image cropping 226 may be excluded from the subset. In another example, the user device 202 may determine that the image cropping 226 does provide a sufficient level of information gain to be included in the subset of image croppings. This subset of image croppings determined for the first contact person may then be transmitted to the resident device 206.

A similar analysis may be performed for the second contact person. In one example, the user device 202 may determine, based on comparing faceprints for each image cropping, that image croppings 218, 222, and 224 each show different facial views of the second contact person, so that a high level of information gain is obtained from each image. In this example, each of the image croppings may then be included in a subset of image croppings of the second contact person that is transmitted to the resident device 206. It should be understood that any suitable size subset of image croppings for a given contact may be determined by a user device (e.g., the user device 202, 204). For example, in an example, where there may be 20 image croppings of the first contact person (e.g., pictured in image 212) in the photo library 210, the user device 202 may select the 10 best image croppings that are determined to provide the most amount of information gain.

As described earlier, in the example depicted in FIG. 2, the image croppings generated for user device 204 portray different portions of the same two people shown in the image croppings of user device 202 (e.g., the first contact person and the second contact person). For example, image croppings 232, 238, and 240 may correspond, respectively, to a portion of a face of the first contact person, while image croppings 234, 236, and 242 may correspond, respectively, to a portion of a face of the second contact person. Similar to as described earlier, a facial characteristics model executing on the user device 204 may generate faceprints for each of the image croppings. The user device 204 may compare the faceprints to determine similarities between the faceprints, and which subset of image croppings may produce the highest level of information gain. For example, the user device 204 may determine that image croppings 232 and 238 form a subset of image croppings for the first contact person (e.g., excluding image cropping 240), while image croppings 234 and 242 form a subset of image croppings for the second contact person (e.g., excluding image cropping 236). The user device 204 may then transmit these subsets to the resident device 206.

In some embodiments, the resident device 206 may receive the subset of image croppings for each contact (e.g., the first and second contact person) from each user device (202, 204). Upon receiving each subset of image croppings, the resident device 206 may further combine subsets that match the same contact person to thereby determine a set of reference images (e.g., image croppings) for the particular contact person. For example, the resident device may follow a similar procedure as described above to determine which image croppings (from the combined subsets for the particular contact person) to include. This may involve selecting image croppings that provide a higher level of information gain. In some embodiments, this may involve a facial characteristics model of the resident device 206 first generating faceprints for each image cropping, comparing the faceprints, and then determining (e.g., selecting) a set of reference images to use. The resident device 206 may then store the set of reference images for each contact person that is received across the different user devices to a local memory of the resident device 206. In this way, the resident device 206 may coordinate (e.g., synchronize) contacts across different user devices and facilitate a shared library between the different user devices. In some embodiments, the resident device 206 may also (or alternatively) store faceprints that correspond to each of the images of a set of reference images for a particular contact person, to be later used for facial recognition (e.g., as described in reference to FIG. 3, below). It should be understood that, as described herein, although a faceprint may be described with reference to a single image cropping, in some embodiments, a faceprint may incorporate characteristics from a plurality of image croppings. In one example, a facial characteristics model may first determine a multi-dimensional vector faceprint for each image cropping. Then the facial characteristics model may compare (e.g., via a cosine similarity) different faceprints and generate a new multi-dimensional vector that incorporates information from the other vectors (e.g., a faceprint that incorporates information from a plurality of image croppings).

In some embodiments, the resident device 206 may receive new image croppings that may be used to update one or more sets of reference images of contact persons. For example, the user device 202 may capture one or more new images of the first contact person (e.g., depicted in image 212). The one or more new images may capture unique portions (and/or may have a higher level of quality) than previous images of the first contact person that are stored in the photo library 210. Accordingly, the user device 202 may determine that the one or more new images provide an additional level of information gain than one or more images from the existing set of reference images. A service may execute on the user device 202 (e.g., executing on any suitable cadence) to determine whether a new image cropping should be sent to the resident device 206 for updating the set of reference images for the first contact person. It should be understood that the resident device 206, as it may receive one or more new images from multiple user devices, may also coordinate updates of reference images across multiple user devices. For example, the resident device 206 may determine what additional information gain may be provided by each new image from each device. In some embodiments, the resident device 206 may generate one or more updated faceprints for new images that are added to generate an updated reference set of reference images for a particular contact person. In at least this way, the resident device 206 may continuously improve the quality (e.g., and/or coverage) of the set of reference images for a particular contact person.

Figure 3:
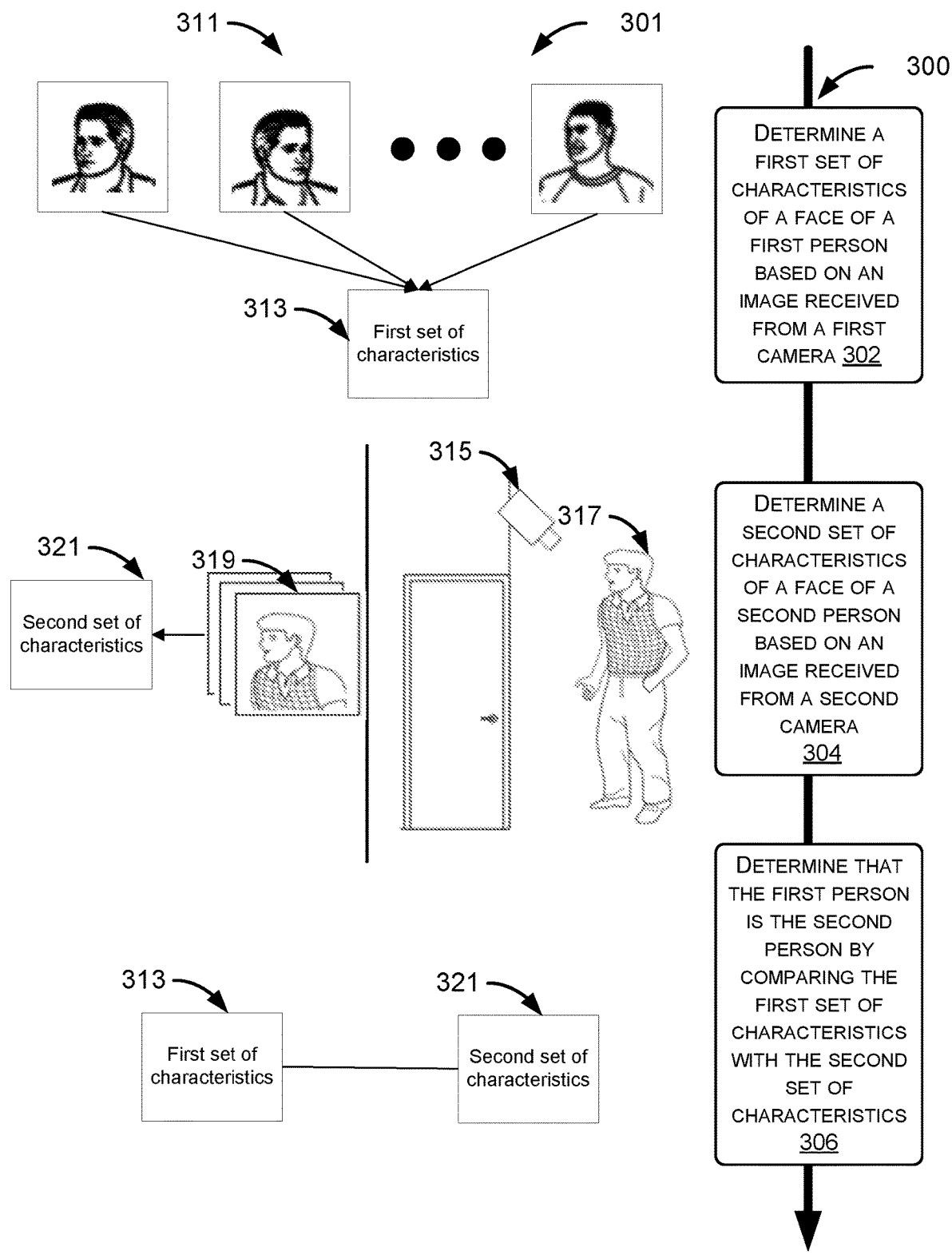
FIG. 3 is another simplified block diagram illustrating at least some example techniques for providing a notification based on determining the presence of a person at a location, according to some embodiments.

FIG. 3 is another simplified diagram depicting an example process performed by a system, according to some embodiments of the present disclosure. The process 300 is an example high-level process for a system (e.g., resident device 102 of FIG. 1 or resident device 206 of FIG. 2) determining the presence of a person at a location. The diagram 301 depicts example states that correspond to blocks of the process 300. The diagram 301 may include elements that are similar to those depicted in reference to FIGS. 1 and 2. For example, a plurality of image croppings 311 may correspond to the representative image croppings 214, 216, and 226 of the first contact person of FIG. 2. In some embodiments, a first set of characteristics 313 may correspond to a faceprint (or multiple faceprints) generated from the plurality of image croppings 311. A person 317 may correspond to the person 120 of FIG. 1, a camera 315 may correspond to the observation camera 122 of FIG. 1, an image 319 (e.g., which may be one of a plurality of images (or frames)) may correspond to an image captured by camera 315, and a second set of characteristics 321 may correspond to a faceprint generated from the image 319.

Turning to the process 300 in further detail, at block 302, the system may determine a first set of characteristics of a face of a first person based on an image received from a first camera. To perform this determination, and, using diagram 301 for illustration, the system may first receive one or more images (e.g., the plurality of image croppings 311), from one or more user devices (e.g., user device 202 and/or user device 204 of FIG. 2). Each of the one or more images may show at least a portion of a face of the first person. This step of receiving images from one or more user devices may be similar to as described in reference to FIG. 2. The system may then execute a trained facial characteristics model to determine a first set of characteristics 313 for the first person. For example, the facial characteristics model may generate a faceprint for each image cropping received. The system may store the first set of characteristics 313 (e.g., storing the image croppings and/or respective faceprints for each image cropping) on the system for later processing. In some embodiments, the system may be configured to store a predefined number of image croppings for a given contact person (e.g., the first person), whereby the image croppings that are stored are selected according to which image croppings provide the most information gain for performing facial recognition of the face of the first person. For example, the system may be configured to store 10 reference image croppings for a given contact. In this example, the system may receive 10 image croppings from a first user device and 10 image croppings from a second user device (all of the same first person). The system may then determine which 10 image croppings among the 20 total image croppings provide the most information gain. This may be done, for example, by comparing faceprints for each of the image croppings to determine similarities/differences (e.g., based on determining cosine similarities between faceprints). In some embodiments, a greater amount of difference may correspond to a greater level of information gain. It should be understood that, even before the system determines the set of reference image croppings for storage, each user device may also have previously selected (e.g., from a photo library on the user device) a subset of photos of the face of the first person based on a determined level of information gain from each photo. In this way, the system may coordinate among user devices to determine which image croppings are the best reference images. It should be noted that this may improve upon conventional methods by reducing the amount of data (e.g., images) being transmitted to the resident device from various user devices. It may also reduce processing power required by the resident device (e.g., processing a reduced number of images), as well as reducing storage requirements for the resident device.

At block 304, the system may determine a second set of characteristics of a face of a second person (e.g., person 317, whose identity has not yet been determined) based on an image (e.g., image 319) received from a second camera (e.g., camera 315). Continuing with diagram 301 for illustration, and, as described herein, the camera 315 may be connected to the system (e.g., the resident device). In an example, the camera 315 may be positioned (e.g., mounted) at a particular location (e.g., outside the doorway to a home), whereby the system may be located inside the home and connected to the camera 315 via a wired (or wireless) connection. The camera 315 may capture a video feed of the person 317 approaching the doorway of the home. The system may receive a plurality of images from the camera 315, which may correspond to a sequence of video frames of the video feed of the camera 315. Image 319 may be one of the plurality of images from the video feed. The facial characteristics model of the system may generate the second set of characteristics 321 based on the image 319. For example, similar to as described above, the facial characteristics model may generate a faceprint of the face of person 317 based on the image 319. In this case, the generated faceprint may correspond to the second set of characteristics 321. It should be understood that, although only a single image (e.g., image 319) of the plurality of images of the video feed is being described in this illustration, the system may generate faceprints for any one or more of the plurality of images received from the camera 315. In some cases, one or more of these faceprints may provide more information gain than others for detecting the face of person 317. For example, in one time interval, a video frame may capture the person 317 facing away from the camera (e.g., providing less information gain), while in another time interval, the person's face may be facing toward (or at a side view from) the camera.

At block 306, the system may determine that the first person is the second person by comparing the first set of characteristics with the second set of characteristics. Using diagram 301 for illustration, the system may compare the first set of characteristics 313 with the second set of characteristics 321. For example, the system may compare one or more faceprints that correspond to the first set of characteristics 313 with one or more faceprints that correspond to the second set of characteristics 321. For example, consider a case where one of the plurality of image croppings 311 shows a side view of the first person contact. In this case, suppose also that image 319 shows a side view of the second person 317. The system may compare faceprints that respectively correspond to each of these images to determine a level of similarity between the faceprints. If there is a high level of similarity (e.g., a cosine similarity of near 1), then the system may determine that the first person is the same as the second person (i.e., thereby determining the identity of the second person as being the first person contact). In some embodiments, the level of similarity may correspond to a score (e.g., between 0 and 1). In some examples, the level of similarity may be matched against a predefined threshold value to determine a level of confidence in the score. It should be understood that multiple faceprint comparisons may be performed when generating a score. For example, faceprints from images of the plurality of images of the video feed from camera 315 may be used for comparison, respectively, against faceprints from multiple image croppings from the plurality of image croppings 311. It should also be understood that the illustration of diagram 301 is simplified for illustration purposes. The system may compare the second set of characteristics 321 (e.g., the faceprint generated from image 319) with multiple faceprints (or sets of faceprints) of multiple contacts of the one or more user devices associated with the system. As discussed herein, these contacts may be automatically determined by the system based on image croppings that are generated and selected from the photo libraries of each user device. Accordingly, the system may automatically and efficiently (e.g., based on a select set of reference images) determine whether the person 317 is one of the contacts from any of the user devices associated with the system. Based on this determination, the system may determine whether to provide a notification, for example, to one or more of the user devices. Also, as described above, in some embodiments, the system may maintain a face quality metric that indicates a level of quality associated with the second set of characteristics 321. For example, the face quality metric may indicate whether an image quality is suitable for recognizing the face of person 317. Consider a case where the person 317 is turned around the camera 315 only captures the back of the person's head. In this case, although the system may still be able to detect that a person is at the front door, but may not be able to recognize the identity of the person based on facial recognition. In this case, the face quality metric may indicate that the quality of the image does not match (e.g., is less than) a predefined threshold for facial recognition. Accordingly, the system may determine whether to provide a notification.

Figure 4:
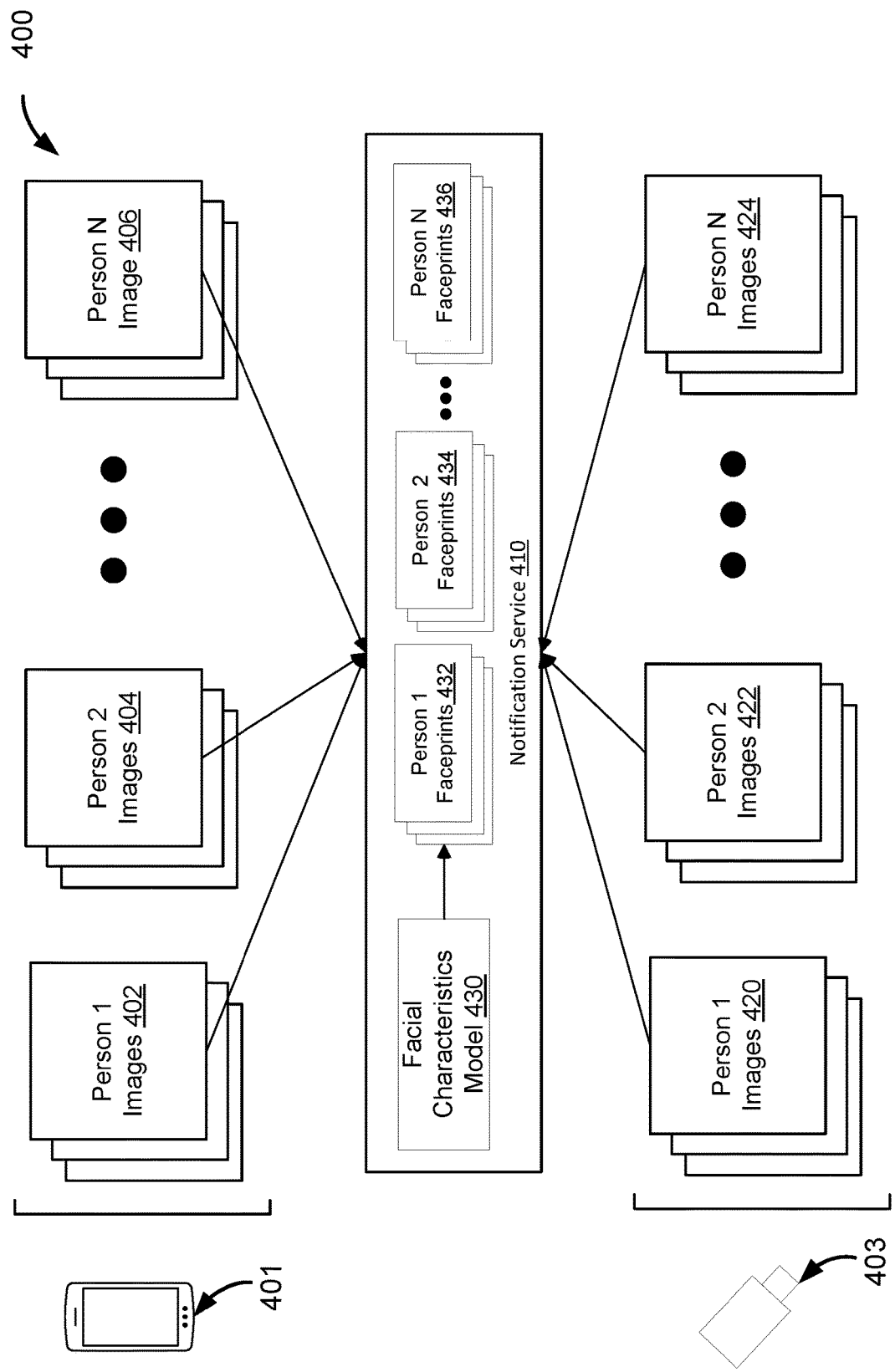
FIG. 4 is another simplified block diagram illustrating at least some example techniques for training a model for performing facial recognition, according to some embodiments.

FIG. 4 is a simplified block diagram 400 illustrating at least some example techniques for training a facial characteristics model for performing facial recognition, according to some embodiments. As described herein, the facial characteristics model may be suitable for determining a set of characteristics of a face of a person. In some embodiments, the set of characteristics may correspond to a faceprint of the person. Accordingly, as described below with respect to FIG. 4, in some embodiments, the facial characteristics model may be trained to determine a faceprint of the person. In some embodiments, faceprints produced by the trained facial characteristics model may be suitable for comparison to one another, for example, to determine similarities and/or differences between faceprints. These determined similarities (or differences) may be used to determine a score for matching the face of one person (e.g., a known contact) with another the face of another person (e.g., at a particular location under camera observation).

Turning to FIG. 4 in further detail, the diagram 400 includes elements that are similar to those depicted in reference to FIGS. 1, 2, and 3. For example, user device 401 may be similar to user device 108 or 112 of FIG. 1. In some embodiments, user device 401 may correspond to any suitable user device that may capture and/or store images in a photo library (e.g., a mobile phone equipped with a digital camera). In some embodiments, the images captured by the camera of user device 401 may have a first level of image quality. For example, the user device and/or camera may be equipped to receive automatic or manual input that enables High Dynamic Range (HDR), for achieving balanced exposure in photos. The camera may also automatically have flash enabled/disabled (for controlling lighting), apply one or more filters to an image, automatically determine a level of contrast in the photo, etc. The camera may also allow for setting a default resolution (e.g., 8, 10, 12.1, etc., megapixels).

Meanwhile, an observation camera 403 of FIG. 4 may be similar to observation camera 122 of FIG. 1 and/or camera 315 of FIG. 3. In some embodiments, the observation camera 403 my correspond to any suitable camera that may capture images that may transmitted to a resident device (e.g., resident device 102) for processing, as described herein. In some embodiments, as described herein, the image captured by the observation camera 403 may have a second level of image quality. In some embodiments, the second level of image quality may be different from (e.g., less than) the first level of image quality of the user device camera. For example, the observation camera 403 may record images at a lower resolution and/or contrast than the user device camera. Also, the observation camera 403 images may record images that have more noise, poorer lighting conditions, etc.

In some embodiments, a notification service 410 may be similar to notification service 130 of FIG. 1. The notification service 410 may include a facial characteristics model 430 which may be similar to any of the facial characteristics models discussed herein. As described below, in some embodiments, the facial characteristics model 430 may be trained based at least in part on receiving training images from different camera sources and/or of different levels of quality. Based on this training process, the facial characteristics model 430 may be trained to determine a faceprint for a person.

In some embodiments, the training process may begin whereby an untrained facial characteristics model 430 receives a plurality of images 402 (e.g., image croppings) of a person (e.g., person 1). This plurality of images 402 may, respectively, include different portions of a face of the person. For example, one portion may be a side view, another portion may be a straight-on view, another portion may be an opposite side view, etc. Some portions may have different conditions and/or backgrounds. In some embodiments, the plurality of images 402 may be captured by the user device 401 at the first level of image quality (or similar levels of quality). The facial characteristics model 430 may also receive a plurality of images 420 of the same person (e.g., person 1). This plurality of images 420 may have been captured by the observation camera 403 at the second level of image quality (or similar levels of quality). Similar to as described above, this plurality of images 420 may, respectively, also include different portions of the face of the person (e.g., person 1). In some embodiments, each image of both pluralities of images 402 and 420 may be labeled as portraying the face of the same person (e.g., person 1). These labels may correspond to "ground truth" data.

In some embodiments, upon receiving both pluralities of images 402 and 420, the system may train the facial characteristics model 430 using a cross-recognition training algorithm. In some embodiments, the cross-recognition training algorithm may utilize any suitable machine learning technique. Some non-limiting examples may include utilizing a neural network, support vector machines, nearest neighbor approach, or decision trees. In one example involving a neural network, the neural network may receive input corresponding to one of the images. In some embodiments, the input may correspond to one or more features of the image. For example, the image may be composed of multiple features (e.g., pixel blocks of an image), which are received by the neural network. The neural network may have one or more layers of nodes (e.g., an input layer, a hidden layer, and/or an output layer). Each node of a layer may represent an element of information. The generated prediction model may include a number of interconnections between the hidden layers and the input layer and/or output layer (e.g., between nodes of the different layers), each of which may be assigned a numeric weight generated based on a pattern identified between the set of input values and the set of output values. The weight may be tuned (e.g., based on a training dataset), rendering the artificial neural network adaptive to inputs and capable of learning. Generally, the hidden layer(s) allows knowledge about the input nodes of the input layer to be shared among the output nodes of the output layer. To do so, a transformation f is applied to the input nodes through the hidden layer. The artificial neural network may also use a cost function to find an optimal solution (e.g., an optimal transformation function). The optimal solution represents the situation where no solution has a cost less than the cost of the optimal solution. In an example, the cost function includes a mean-squared error function that minimizes the average squared error between an output f (x) (e.g., a prediction, given training data input x) and a target value y (e.g., a ground truth value) over the example pairs (x, y). In some embodiments, a backpropagation algorithm that uses gradient descent to minimize the cost function may be used to train the artificial neural network. In this example, one or more parameters (e.g., which also may be known as "hyperparameters") may be used to administer the training process. For example, these parameters may include determining how many hidden layers of nodes to use between the input layer and the output layer, and how many nodes each layer should use. In this example, the collection of nodes and determined weights (e.g., based on training data) between interconnections of nodes between the different layers may form the trained model.

Continuing with the training process example of FIG. 4, and, with the cross-recognition training algorithm utilizing a neural network as an example, the neural network may be trained to receive as input one image of the plurality of images 402 and output a first faceprint of the face (e.g., of person 1) shown in the image. As described herein, the faceprint may correspond to a multidimensional vector, whereby each dimension of the vector corresponds to a characteristic of the face of the person in the image (e.g., a distance between two known points on the face). The neural network may also receive as input one image of the plurality of images 420 and output a second faceprint of the face (e.g., of the same person 1) shown in the image. In some cases, the cross-recognition algorithm may associate the first faceprint with the second faceprint as corresponding to the same person (e.g., person 1). For example, as described above, each of the images from both pluralities of images 402, 420 may be labeled (e.g., as the first person). Also, in some cases, the images may be labeled to describe the type of portion of the face that is portrayed (e.g., a side portion, a straight-on view, etc.). In some embodiments, the cross-recognition training algorithm may compute a similarity (e.g., cosine similarity) between the vectors of each faceprint. Then, based at least in part on the output and a known similarity between images (e.g., based on the ground truth data of the labels), the cross-recognition training algorithm may adjust dimensions of one or more of the faceprints. For example, as described above, the cross-recognition training algorithm may utilize a backpropagation algorithm to minimize a cost function associated with the distance between faceprints (e.g., distance between faceprint vectors). In some embodiments, this backpropagation algorithm may be used to tune (e.g., update) weights of nodes of the neural network. In this way, the neural network may be trained to generate faceprints from images of the same face, whereby the images may have varying levels of quality. The faceprints may later be used for efficient comparison during facial recognition (e.g., at block 306 of FIG. 3). In some embodiments, multiple "person 1 faceprints" 432 may be generated for person 1 as part of the training process. For example, the facial characteristics model 430 may generate a faceprint for each view (e.g., portion) of the face shown in respective images (e.g., for each image of a respective plurality of images 402, 420). As described above, it should be understood that a faceprint may be stored in any suitable data structure (e.g., a multi-dimensional array of values).

In some embodiments, the facial characteristics model 430 may be trained based at least in part on receiving different sets of pluralities of images associated with multiple persons. For example, similar to as described above in reference to "person 1," the facial characteristics model 430 may receive a plurality of images 404 (e.g., image croppings) of another person (e.g., person 2). This plurality of images 402 may, respectively, include different portions of a face of the person. The facial characteristics model 430 may also receive a plurality of images 422 of the same person (e.g., person 2). This plurality of images 422 may have been captured by the observation camera 403 at the second level of image quality (or similar levels of quality). The facial characteristics model 430 may utilize a similar technique as described above to train the facial characteristics model 430 to generate a set of "person 2 faceprints" 434. Accordingly, the facial characteristics model 430 may receive training samples associated with any suitable number of persons (e.g., several hundred, thousand, etc.), and produce faceprints for each person (e.g., generating "person N faceprints" 436 based on receiving a plurality of images 406 (e.g., of person N) and another plurality of images 424 (e.g., also of person N).

As described herein, it should be understood that one of the advantages of embodiments of the present disclosure is that the system may perform facial recognition using images that may have different camera sources and/or differing levels of quality. For example, a set of reference images may be primarily captured by a user's mobile phone. These reference images may typically have a higher level of quality than images captured by an observation camera. Embodiments of the present disclosure effectively "bridge the gap" by allowing the system to recognize faces in images of lower quality by comparing with faces in images of higher quality. As described in reference to FIG. 4, the trained facial characteristics model 430 enables a mechanism for this comparison by generating faceprints that are suitable for efficient comparison.

In some embodiments, once trained, the trained facial characteristics model 430 may be used to generate faceprints for a face of any suitable person (e.g., including faces of persons that were not part of the training samples for training the facial characteristics model 430). In some embodiments, the trained facial characteristics model 430 may be deployed to be executed in any suitable environment. For example, as described herein, the trained facial characteristics model 430 may execute on a user device (e.g., user device 202 or 204 of FIG. 2) and/or on a resident device (e.g., resident device 206 of FIG. 2). Also, the process for training the facial characteristics model 430 may be performed on any suitable device (e.g., a resident device, a user device, on a remote server (e.g., in the cloud), etc. For example, a cloud computing platform may train the facial characteristics model 430, and then distribute the model to user devices and/or resident devices. In some embodiments, different trained models (e.g., each trained using different sets of training data) may be deployed to different devices. For example, the cloud computing platform may receive one set of training images (e.g., from one or more users), train the facial characteristics model 430, and then deploy the facial characteristics model 430 to devices associated with the one or more users. In some embodiments, the trained facial characteristics model 430 may be updated on any suitable cadence (e.g., based on new training data samples and/or utilizing an updated cross-recognition training algorithm).

Figure 5:
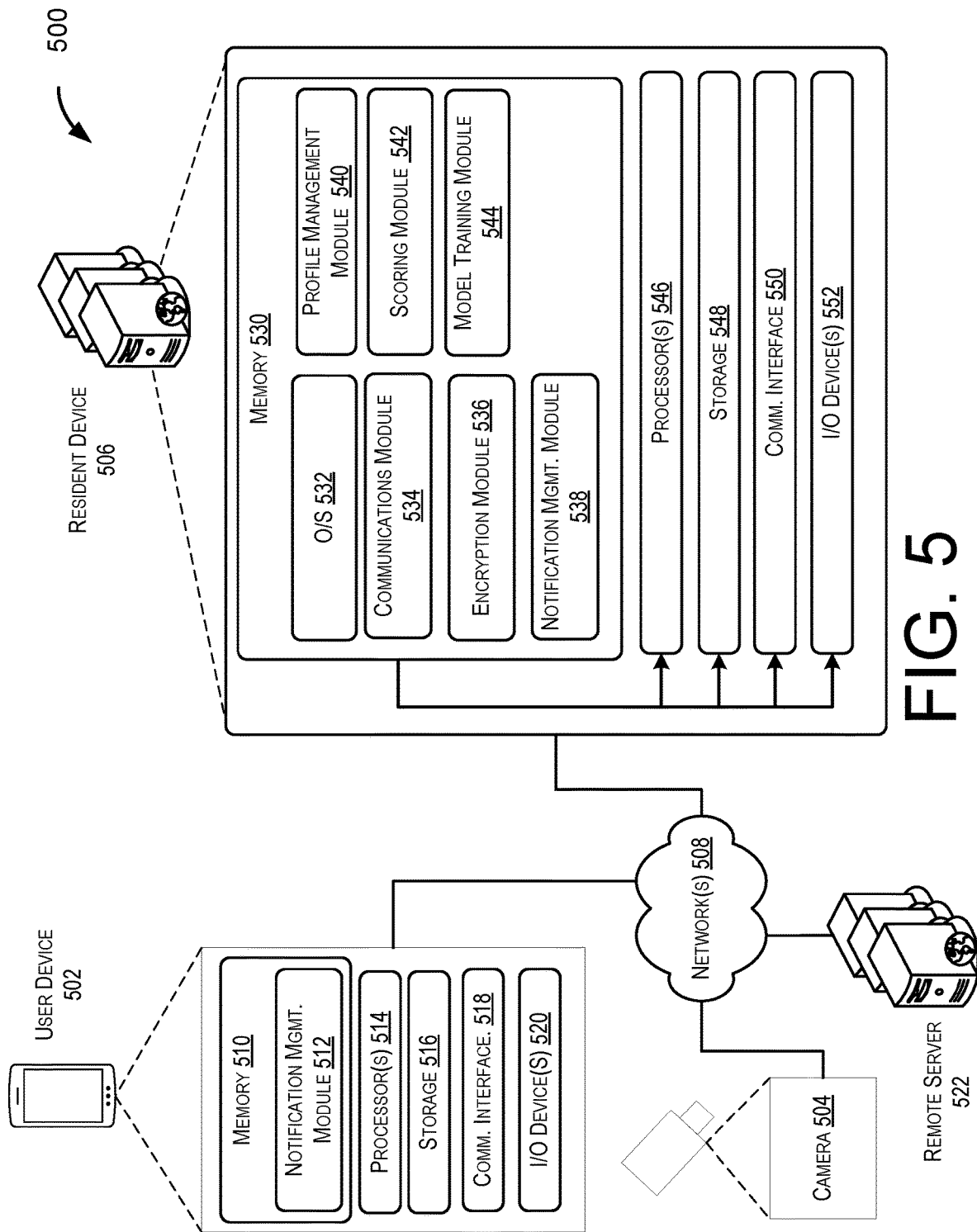
FIG. 5 is another simplified block diagram illustrating an example architecture of a system used to provide notifications based on determining the presence of a person at a location, according to some embodiments.

FIG. 5 is another simplified block diagram 500 illustrating an example architecture of a system used to provide notifications based on determining the presence of a person at a location, according to some embodiments. The diagram 500 includes a user device 502 (e.g., which may have an integrated camera component), an observation camera 504, a resident device 506, a network 508, and a remote server 522. The user device 502, the observation camera 504, and the resident device 506, respectively, may be similar to any of the user devices, observation cameras, and/or resident devices described herein. The remote server 522 may correspond to one or more server computers (e.g., a server cluster) of a cloud computing platform, as described herein.

The network 508 may include any suitable communication path or channel such as, for instance, a wire or cable, fiber optics, a telephone line, a cellular link, a radio frequency (RF) link, a WAN or LAN network, the Internet, or any other suitable medium. The network 508 may include any one or a combination of many different types of networks, such as cable networks, the Internet, wireless networks, cellular networks, and other private and/or public networks.

Turning to each element in further detail, the user device 502 may be any suitable computing device (e.g., a mobile phone, tablet, personal computer (PC), smart glasses, a smart watch, etc.). In some embodiments, the user device 502 will have a camera embedded as a component of the device (e.g., a mobile phone camera). In some embodiments, the user device 502 will be connected to another device (e.g., a standalone digital camera), from which it receives images (e.g., over the network 508). The user device 502 has at least one memory 510, one or more processing units (or processor(s)) 514, a storage unit 516, a communications interface 518, and an input/output (I/O) device(s) 520.

The processor(s) 514 may be implemented as appropriate in hardware, computer-executable instructions, firmware or combinations thereof. Computer-executable instruction or firmware implementations of the processor(s) 514 may include computer-executable or machine executable instructions written in any suitable programming language to perform the various functions described.

The memory 510 may store program instructions that are loadable and executable on the processor(s) 514, as well as data generated during the execution of these programs. Depending on the configuration and type of user device 502, the memory 510 may be volatile (such as random access memory (RAM)) and/or non-volatile (such as read-only memory (ROM), flash memory, etc.). In some implementations, the memory 510 may include multiple different types of memory, such as static random access memory (SRAM), dynamic random access memory (DRAM) or ROM. The user device 502 may also include additional storage 516, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 516 may be utilized to storage a photo library containing one or more images on the user device 502.

The user device 502 may also contain the communications interface 518 that allow the user device 502 to communicate with a stored database, another computing device or server, user terminals, and/or other devices on the network(s) 508. The user device 502 may also include I/O device(s) 520, such as for enabling connection with a keyboard, a mouse, a pen, a voice input device, a touch input device, a display, speakers, a printer, etc.

Turning to the contents of the memory 510 in more detail, the memory 510 may include an operating system and one or more application programs or services for implementing the features disclosed herein, including a notification management module 512. The notification management module 512 may be responsible for performing one or more tasks, including configuring a notification service of the resident device 506 and/or sending (and/or receiving) data (e.g., image croppings) to the resident device 506. For example, as described herein, the notification management module 512 may receive input for configuring the resident device with settings for providing notifications. As described herein, one example may be a setting that indicates that the resident device 506 should only provide a notification to the user device 502 if a person is detected that is (or is not) a contact associated with the user device (e.g., the person is not found in any of the images in the photo library in storage 516). In another example, a setting may indicate how a notification should be provided. For example, one setting may indicate that the resident device 506 should transmit a notification message to the user device 502. Another setting may indicated that the resident device should announce a notification on a speaker connected to the resident device 506. The notification management module 512 (e.g., via a service or background application running on the user device 502) may transmit images (e.g., image croppings generated from the photo library) to the resident device 506 for processing by the resident device 506. These images may be transmitted on any suitable cadence and/or selection algorithm, for example, as described in reference to FIG. 2. In some embodiments, the user device 502 may first encrypt images that are transmitted to the resident device 506. For example, the user device 502 and the resident device 506 may share an encryption key (e.g., a symmetric key), whereby the resident device 506 receives an encrypted image and then decrypts the image using the encryption key. In some embodiments, as described further herein, the encryption key may not be shared (or may be shared) with the remote server 522. In some embodiments, the images may be first transmitted to the remote server 522 (e.g., for temporary storage), and then later transmitted by the remote server 522 to the resident device 506. In some embodiments, the images may be transmitted directly to the resident device 506, without involving the remote server 522. It should be understood that one or more functions of the notification management module 512 may be performed by the resident device 506 (e.g., configuring the resident device).

In some embodiments, the observation camera 504 may correspond to any suitable camera for capturing and transmitting images to the resident device 506. In some embodiments, the observation camera 504 may be positioned (e.g., mounted) at a particular location to have a particular viewable area, for example, near the front door of a home. The observation camera 504 may be connected to the resident device 506 via network 508.

In some embodiments, as described above the remote server 522 may correspond to a cloud computing platform. The remote server 522 may perform one or more functions, including, for example: training one or more facial characteristics models (e.g., similar to as described in reference to FIG. 4), managing updates to facial characteristics models, receiving images from user devices (e.g., user device 502), transmitting images to a resident device 506, etc. As described above, in some embodiments, the remote server 522 may not (or may) have access to an encryption key used by the user device 502 to encrypt images. In some embodiments, remote server 522 may receive images from the user device 502, for example, when the user device 502 does not have direct access to the resident device 506. In this example, the user device 502 may first transmit an encrypted image (e.g., image cropping) to the remote server 522 in the cloud. The cloud may store the encrypted image cropping for later transmission to the resident device 506.

Turning to the resident device 506 in further detail, the resident device 506 may be a computer system that comprises at least one memory 530, one or more processing units (or processor(s)) 546, a storage unit 548, a communication device 550, and an I/O device 552. In some embodiments, these elements may be implemented similarly (or differently) than as described in reference to similar elements of user device 502. In some embodiments, the storage unit 408 may store images (e.g., image croppings) received by user device 502 and/or remote server 522. The resident device 506 may be housed in any suitable unit (e.g., a smart TV, a smart speaker, etc.).

Turning to the contents of the memory 530 in more detail, the memory 530 may include an operating system 532 and one or more application programs or services for implementing the features disclosed herein, including a communications module 534, an encryption module 536, a notification management module 538, a profile management module 540, a scoring module 542, and a model training module 544. In some embodiments, one or more application programs or services of memory 530 may be included as part of the notification service 130 of FIG. 1.

The communications module 534 may comprise code that causes the processor 546 to generate messages, forward messages, reformat messages, and/or otherwise communicate with other entities. For example, the communications module 534 may receive (and/or transmit) images from the user device 502 and/or remote server 522. The communications module 534 may also be responsible for providing notifications. For example, the communications module 534 may transmit a notification message to the user device 502 upon detecting the presence of a person based on an image received from observation camera 504. In some embodiments, the communications module 534 may provide a notification using any suitable channel and/or to any suitable device. For example, the communications module 534 may provide an audible notification via a speaker I/O device 552 at a location within a home environment. In another example, the communications module 534 may provide an audiovisual notification to a smart TV within a home environment. For example, a PIP display of the smart TV may display a video feed from camera 504 (e.g., showing a user at the front door of a home). The smart TV may also announce who is at the door and/or allow two-way communication via a speaker and/or microphone I/O devices of the resident device 506.

The encryption module 536 may comprise code that causes the processor 546 to encrypt and/or decrypt messages. For example, the encryption module 536 may receive encrypted data (e.g., an encrypted image cropping) from the remote server 522. The encryption module 536 may include any suitable encryption algorithms to encrypt data in embodiments of the invention. Suitable data encryption algorithms may include Data Encryption Standard (DES), tripe DES, Advanced Encryption Standard (AES), etc. It may also store (e.g., in storage unit 548) encryption keys (e.g., encryption and/or decryption keys) that can be used with such encryption algorithms. The encryption module 536 may utilize symmetric or asymmetric encryption techniques to encrypt and/or verify data. For example, as noted above, the user device 502 may contain similar code and/or keys as encryption module 536 that is suitable for encrypting/decrypting data communications with the resident device (and/or remote server 522).

The notification management module 538 may comprise code that causes the processor 546 to store and manage settings for providing notifications, as described herein. The notification management module 538 may also be responsible for generating notifications that are provided by the communications module 534. It should be understood that a notification may presented in any suitable form (e.g., text, audio, video, and/or suitable combinations). In some embodiments, the notification management module 538 may be configured to performing no operation (e.g., a "no-op") in a particular setting. For example, the resident device 506 may be configured to only provide AV-based notifications to user device 502 if a detected person is not a contact. Accordingly, if the resident device 506 detects a contact person, the notification management module 538 may determine to perform no operation (e.g., remaining silent, only logging the observation internally, etc.). In some embodiments, the notification management module 538 may also determine whether to provide notifications based on whether a face is recognizable or not.

The profile management module 540 may comprise code that causes the processor 546 to maintain and store profiles of contacts. For example, as described herein (e.g., in reference to FIG. 2), the profile management module 540 may receive images (e.g., image croppings) from one or more user devices, each image cropping showing a portion of a face of a contact associated with the respective user device. The profile management module 540 may determine (e.g., via a trained facial characteristics model) a set of reference images for a given contact based on the image croppings received. In some embodiments, the profile management module 540 may also determine a set of characteristics based on the set of reference images (e.g., generating a faceprint for each reference image). In some embodiments, the set of reference images (and/or one or more faceprints that correspond to the set of reference images) may be stored in storage unit 548. The set of reference images for a given face may be updated on any suitable cadence, as new image croppings are received that provide more information gain than the existing reference set.

The scoring module 542 may comprise code that causes the processor 546 to determine a score that corresponds to a level of similarity between a first set of characteristics (e.g., associated with a face of a first person) and a second set of characteristics (e.g., associated with a face of a second person). In some embodiments, the scoring module 542 may utilize a trained facial characteristics model to generate a faceprint (and/or multiple faceprints) based on one or more reference images (e.g., image croppings) of the first person. The facial characteristics model may also generate a faceprint (and/or multiple faceprints) based on one or more images received from the camera 504 (e.g., showing the face of the second person). The system may then compare faceprints (e.g., determining a similarity between faceprint vectors) to determine the score. In some embodiments, the resident device 506 may utilize the score to determine whether the first person is the second person. In this way, the resident device 506 may determine whether or not to provide a notification, and, if so, what type of notification to provide. In some embodiments, the first set of characteristics may correspond to the faceprint(s) of the first person (e.g., generated from a set of one or more reference images), and the second set of characteristics may correspond to the faceprint(s) of the second person (e.g., generated based on the image(s) received from observation camera 504). In some embodiments, as described herein, the scoring module 542 may also determine, based on a face quality metric, whether or not the face of the second person is recognizable or not recognizable. In some embodiments, the system may first determine that a face is recognizable before determining if the face is a known contact. For example, a face may be considered recognizable if the set of facial characteristics of an image (e.g., received from observation camera 504) are of a sufficient quality (e.g., matching a predefined threshold) so that the system may thereafter accurately determine if the person is a known contact or not.

The model training module 544 may comprise code that causes the processor 546 to train a facial characteristics model. In some embodiments, the operations of model training module 544 may be similar to as described in reference to FIG. 4. It should be understood that, in some embodiments, the operations of the model training module 544 may also be performed by the remote server 522.

Figure 6:
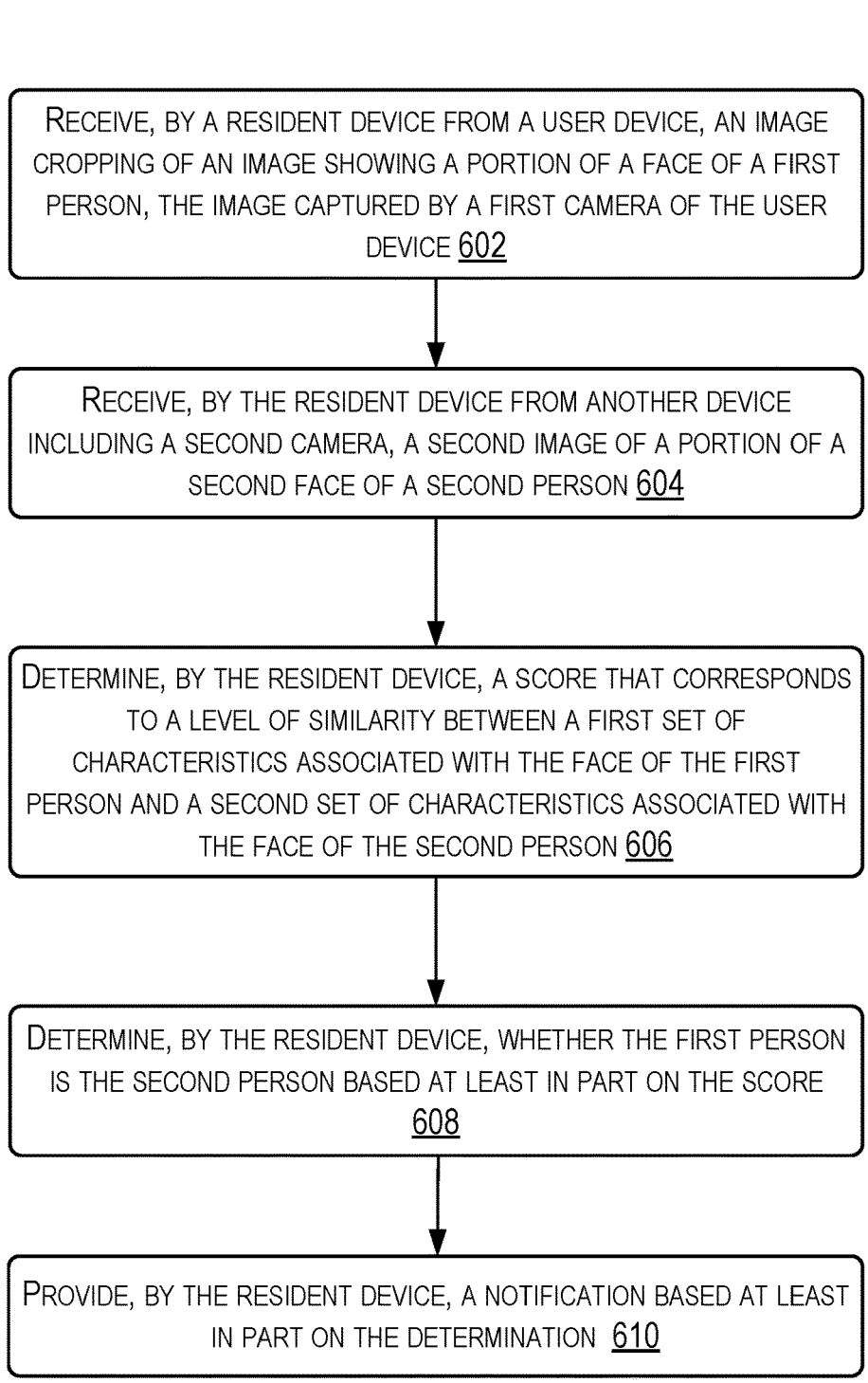
FIG. 6 is a simplified flow diagram illustrating an example process for providing a notification based on determining the presence of a person at a location, according to some embodiment.

FIG. 6 is a simplified flow diagram illustrating an example process 600 for providing a notification based on determining the presence of a person at a location, according to some embodiments. Process 600 and process 700 of FIG. 7 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some embodiments, process 600 may be performed by a resident device, which may correspond to any one or more of the resident devices described herein. At block 602, the resident device may receive from a user device an image cropping of an image showing a portion of a face of a first person, the image being captured by a first camera of the user device. In some embodiments, the image may be one of a plurality of images (e.g., non-cropped images) that are managed as part of a library of images (e.g., a photo library) comprising contacts associated with the user device. In some embodiments, the plurality of images are stored on a local memory repository of the user device. In some embodiments, the user device is a mobile device (e.g., a mobile phone). In some embodiments, the image is one of a subset of the plurality of images. The subset may be selected based at least in part on an information gain associated with the portion of the face of the first person. The information gain may be used to perform a facial recognition of the face of the first person. In some embodiments, the image cropping is one of a plurality of image croppings, whereby the plurality of image croppings are respectively generated from the subset of the plurality of images. In some embodiments, the plurality of image croppings may be included within a reference set of images (e.g., image croppings) that are stored on the resident device.

At block 604, the resident device may receive from another device that includes a second camera, a second image of a portion of a face of a person (e.g., a "second person," whose identity is not yet determined). In some embodiments, the other device may correspond to an observation camera that may have a viewable area including a particular location associated with the resident device. For example, the observation camera may be positioned to have a viewable area of a front door porch of a home, an area within a home, an office space, etc. In some embodiments, the received image of block 602 and the received second image of block 604 may have a different level of image quality. In some embodiments, the level of image quality may be associated with at least one of: (1) a level of distortion, (2) an image resolution, (3) a lighting at the particular location, (4) an image occlusion, (5) an image contrast, (6) an image artifact, or (7) an image sharpness. In some embodiments, the second image may be one of a plurality of images (e.g., video frames) received from the second camera.

At block 606, the resident device, may determine a score that corresponds to a level of similarity between a first set of characteristics associated with the face of the first person (e.g., see block 602) and a second set of characteristics associated with the face of the second person (e.g., see block 604). In some embodiments, the resident device may utilize a trained facial characteristics model to generate one or more faceprints. For example, the trained facial characteristics model may generate one or more faceprints that collectively correspond to the first set of characteristics. In one example, a faceprint may be created based on each reference image of the set of reference images described at block 602. In another example, a faceprint (e.g., a multidimensional vector) may incorporate data from other faceprints created into a single encompassing vector (or other suitable data structure). The trained facial characteristics model may also generate one or more faceprints based on the second image (and/or plurality of images) received from the second camera, whereby the one or more faceprints collectively correspond to the second set of characteristics. The resident device may then determine the score that corresponds to the level of similarity (e.g., a cosine similarity) between different faceprints (e.g., generated from the different sets of images).

At block 608, the resident device may determine whether the first person is the second person based at least in part on the score. In some embodiments, the resident device may first determine whether the face of the second person is recognizable or not, for example, based on analyzing the second set of characteristics (e.g., the faceprint of the second person) to determine a face quality metric for the face. The face quality metric may indicate a level of quality associated with the second set of characteristics. If the face quality metric matches (e.g., equals or exceeds) a threshold value, then the face may be determined to be recognizable. If the face is recognizable, the resident device may further determine if the face of the second person matches any of the contacts (e.g., including the first person) of the photo library of the user device. In this way, the resident device may determine the identity of the second person.

At block 610, the resident device may provide a notification based at least in part on the determination. As described herein, a notification may be provided using any suitable channel and/or according to any suitable settings. For example, one setting may indicate whether to provide a notification based in part on whether the second person's face is recognizable or not, and, if so, whether or not the second person is a known contact or not. In some embodiments, the setting may indicate whether to suppress transmission of a notification message to the user device, for example, to reduce the number of notifications being transmitted to the user device.

Figure 7:
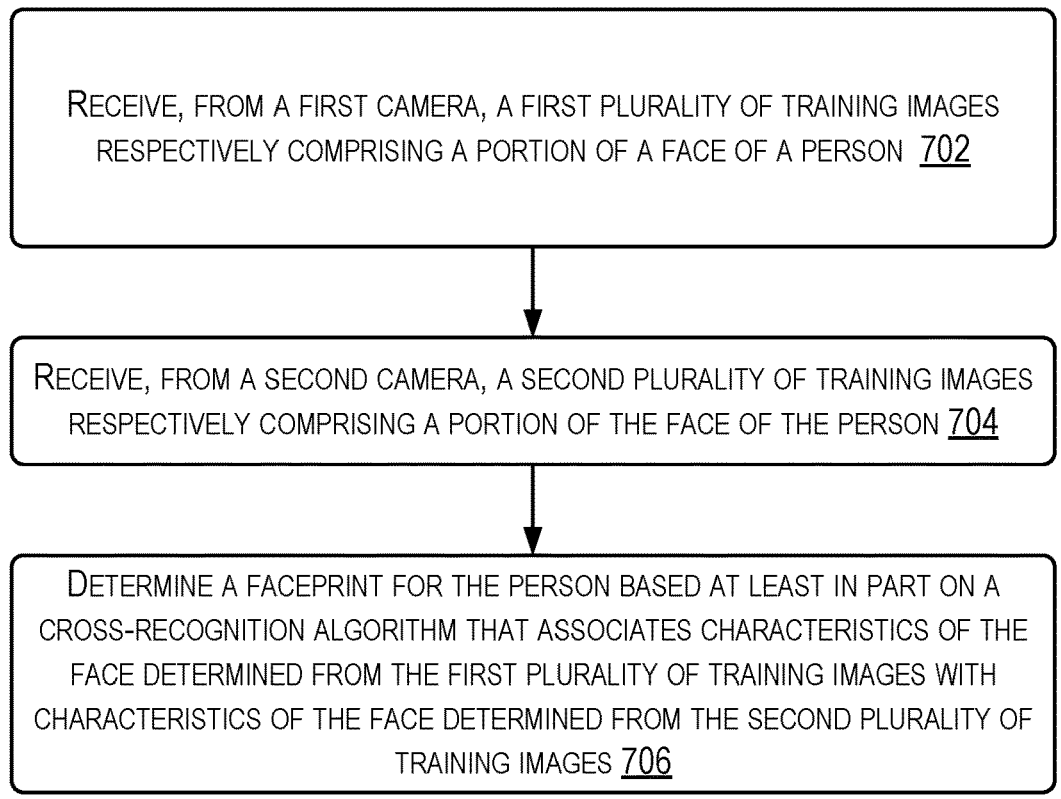
FIG. 7 is another simplified flow diagram illustrating an example process for training a model for performing facial recognition, according to some embodiments.

FIG. 7 is another simplified flow diagram illustrating an example process 700 for training a facial characteristics model for performing facial recognition, according to some embodiments. In some embodiments, the process 700 may be performed by any suitable device (e.g., a resident device or a remote server). In some embodiments, one or more of the operations of process 700 may be similar to as described in reference to FIG. 4.

At block 702, the process 700 includes receiving, from a first camera, a first plurality of training images (e.g., image croppings) respectively comprising a portion of a face of a person. In some embodiments, the person may be one of a plurality of people, whereby each person of the plurality of people is associated with a set of training images (e.g., collectively forming a corpus of training samples). Each image may show a portion of the person's face (e.g., side view, straight-on view) for the respective plurality of training images. In some embodiments, the first camera may be a component of (and/or otherwise connected to) a user device (e.g., a mobile phone camera). In some embodiments, the first camera may capture images having a first level of quality (or similar level of quality), for example, having a common resolution, good lighting conditions, minimal noise, etc. In some embodiments, each training image may have a corresponding label that identifies an associated person's face.

At block 704, the process 700 includes receiving, from a second camera, a second plurality of training images respectively comprising a portion of the face of the person. In some embodiments, the second camera may be different than the first camera. For example, the second camera may be an observation camera. In some embodiments, the second camera may capture images having a second level of quality that is different from (e.g., lower than) the first level of quality. In some embodiments, the second level of quality may not be different from the first level of quality. In some embodiments, each person of the plurality of people may have a corresponding plurality of training images captured by the second camera (e.g., forming another corpus of training samples). Similar to block 702, in some embodiments, each image may have a corresponding label that identifies an associated person's face.

At block 706, the process 700 includes determining a faceprint for the person based at least in part on a cross-recognition training algorithm. In some embodiments, the cross-recognition training algorithm associates characteristics of the face of the person determined from the first plurality of training images with characteristics of the face of the person determined from the second plurality of training images. In some embodiments, the cross-recognition training algorithm may operate similar to as described in reference to FIG. 4. In some embodiments, the cross-recognition training algorithm may enable the facial characteristics model to generate faceprints of a face based on respective labeled training images of different quality (e.g., captured by different cameras) so that, upon comparison of the faceprints (e.g., determining a similarity of faceprint vectors), the faceprints may be determined to match the same person. It should be understood that the facial characteristics model may be trained based on labeled training image samples from multiple people (e.g., as described at blocks 702 and 704). In some embodiments, a trained facial characteristics model may enable a higher level of accuracy for performing facial recognition using faceprints than conventional methods.

Illustrative techniques for providing a notification based on determining the presence of a person at a location are described above. Some or all of these techniques may, but need not, be implemented at least partially by architectures such as those shown at least in FIGS. 1-7 above. While many of the embodiments are described above with reference to resident devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data (e.g., images of people) to perform facial recognition. The present disclosure contemplates that in some instances, this gathered data may include personally identifiable information (PII) data that uniquely identifies or can be used to contact or locate a specific person. Such personal information data can include facial characteristics, demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to identify a person as being a contact (or not known contact) of a user of a user device.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to performing facial recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, comprising:
receiving, by a resident device and from a first device comprising a first camera, a first plurality of images taken by the first camera of the first device and stored in a photo library of the first device at a first time, the first plurality of images comprising at least first respective croppings of faces of people, and the first device comprising a mobile device associated with a location where the resident device is located;
receiving, by the resident device and from a second device comprising a second camera, a second plurality of images taken by the second camera at a second time, the second plurality of images comprising at least second respective croppings of the faces of the same people collected by the second camera, and the second camera comprising an observational camera located at the location;

generating a set of reference images comprising the first respective croppings and the second respective croppings, the set of reference images being updated to exclude a first subset of croppings below a threshold information gain and add a second subset of croppings above the threshold information gain;

executing, by the resident device, an algorithm utilizing the first respective croppings and the second respective croppings; and generating, by the resident device, a faceprint for a person based at least in part on an output of the algorithm and the set of reference images.

2. The computer-implemented method of claim 1, further comprising:
receiving, by the resident device and from the second device, a reference image taken by the second camera;
comparing, by the resident device, a reference face identified in the reference image to the generated faceprint for the person;
determining, by the resident device, whether the reference face corresponds to the faceprint for the person; and
providing, by the resident device, a notification to the first device based at least in part on the determination.

3. The computer-implemented method of claim 1, wherein the algorithm comprises a cross-recognition training algorithm.

4. The computer-implemented method of claim 1, wherein the algorithm comprises a facial characteristics model.

5. The computer-implemented method of claim 4, wherein the first respective croppings and the second respective croppings are associated with characteristics of faces.

6. The computer-implemented method of claim 4, wherein at least a subset of the first respective croppings and the second respective croppings are labeled as the person.

7. The computer-implemented method of claim 1, wherein the first respective croppings are of a first level of quality and the second respective croppings are of a second level of quality.

8. The computer-implemented method of claim 7, wherein the first level of quality is higher than the second level of quality.

9. The computer-implemented method of claim 1, wherein the person corresponds to a contact associated with the first device.

10. The computer-implemented method of claim 1, wherein at least a subset of the first respective croppings or the second respective croppings comprise image croppings.

11. The computer-implemented method of claim 1, wherein the faceprint corresponds to a multidimensional vector, and wherein each dimension of the multidimensional vector is associated with at least one face characteristic of the face of the person.

12. The computer-implemented method of claim 1, further comprising determining whether a face quality metric exceeds a recognizability threshold.

13. One or more computer-readable storage media comprising computer-executable instructions that, when executed by one or more processors of a resident device, cause the one or more processors to perform operations comprising:
receiving, from a first device comprising a first camera, a first plurality of images taken by the first camera of the first device and stored in a photo library of the first device at a first time, the first plurality of images comprising at least first respective croppings of a faces of people, and the first device comprising a mobile device associated with a location where the resident device is located;
receiving, from a second device comprising a second camera, a second plurality of images taken by the second camera at a second time, the second plurality of images comprising at least second respective portions of the face-faces of the same people collected by the second camera, and the second camera comprising an observational camera located at the location;
generating a set of reference images comprising the first respective cropping and the second respective croppings, the set of reference images being updated to exclude a first subset of croppings below a threshold information gain and add a second subset of croppings above the threshold information gain;
executing an algorithm utilizing the first respective croppings and the second respective croppings; and
generating a faceprint for a person based at least in part on an output of the algorithm and the set of reference images.

14. The one or more computer-readable storage media of claim 13, wherein the operations further comprise:
receiving, from the second device, a reference image taken by the second camera;
comparing a reference face identified in the reference image to the generated faceprint for the person;
determining whether the reference face corresponds to the faceprint for the person; and
providing a notification to the first device based at least in part on the determination.

15. The one or more computer-readable storage media of claim 13, wherein the first respective croppings are of a first level of quality and the second respective croppings are of a second level of quality, and wherein the first level of quality is higher than the second level of quality.

16. The one or more computer-readable storage media of claim 13, wherein the faceprint corresponds to a multidimensional vector, and wherein each dimension of the multidimensional vector is associated with at least one face characteristic of a face of the person.

17. A resident device, comprising:
a memory configured to store computer-executable instructions; and
one or more processors in communication with the memory and configured to access the memory and execute the computer-executable instructions to at least:
receive, from a first device comprising a first camera, a first plurality of images taken by the first camera of the first device and stored in a photo library of the first device at a first time, the first plurality of images comprising at least first respective croppings of faces of people, and the first device comprising a mobile device associated with a location where the resident device is located;
receive, from a second device comprising a second camera, a second plurality of images taken by the second camera at a second time, and the second plurality of comprising at least second respective croppings of the faces of the same people collected by the second camera, and the second camera comprising an observational camera located at the location;
generate a set of reference images comprising the first respective cropping and the second respective croppings, the set of reference images being updated to exclude a first subset of croppings below a threshold information gain and add a second subset of croppings above the threshold information gain;

execute an algorithm utilizing the first respective croppings and the second respective croppings; and generate a faceprint for a person based at least in part on an output of the algorithm and the set of reference images.

18. The resident device of claim 17, wherein the one or more processors are further configured to access the memory and execute the computer-executable instructions to at least:

receive, from the second device, a reference image taken by the second camera;

comparing a reference face identified in the reference image to the generated faceprint for the person;

determine whether the reference face corresponds to the faceprint for the person; and provide a notification to the first device based at least in part on the determination.

19. The resident device of claim 17, wherein the first respective croppings are of a first level of quality and the second respective croppings are of a second level of quality, and wherein the first level of quality is higher than the second level of quality.

20. The resident device of claim 17, wherein the faceprint corresponds to a multidimensional vector, and wherein each dimension of the multidimensional vector is associated with at least one face characteristic of the face of the person.

21. The resident device of claim 17, wherein the first respective croppings are of a first level of quality and the second respective croppings of a second level of quality, and wherein the first level of quality is higher than the second level of quality.

22. The resident device of claim 17, wherein the faceprint corresponds to a multidimensional vector, and wherein each dimension of the multidimensional vector is associated with at least one face characteristic of the face of the person.

* * * * *

UNITED STATES PATENT AND TRADEMARK OFFICE
CERTIFICATE OF CORRECTION

PATENT NO. : 12,131,583 B2
APPLICATION NO. : 17/949880
DATED : October 29, 2024
INVENTOR(S) : Hendrik Dahlkamp et al.

It is certified that error appears in the above-identified patent and that said Letters Patent is hereby corrected as shown below:

In the Claims

Column 34, Line 8: In Claim 13 please delete "face-faces" and insert --faces--.

Signed and Sealed this
Third Day of December, 2024

Katherine Kelly Vidal
*Director of the United States Patent and Trademark Office*